United States Patent [19]
Hiyokawa

[11] Patent Number: 5,931,888
[45] Date of Patent: *Aug. 3, 1999

[54] NAVIGATION SYSTEM FOR VEHICLES WITH ALTERNATIVE ROUTE SEARCHING CAPABILITIES

[75] Inventor: Toyoji Hiyokawa, Anjo, Japan

[73] Assignee: Aisin AW Co., Ltd., Anjo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/528,348

[22] Filed: Sep. 14, 1995

[30] Foreign Application Priority Data

Sep. 22, 1994 [JP] Japan .................................. 6-228088
Sep. 22, 1994 [JP] Japan .................................. 6-228174

[51] Int. Cl.$^6$ .................................................. G06F 17/00
[52] U.S. Cl. ........................................... 701/208; 701/210
[58] Field of Search ................................ 364/443, 444.1, 364/444.2, 449.1, 449.2, 449.3, 449.4, 449.5; 340/988, 990, 995; 701/200, 201, 202, 207, 208, 209, 210, 211

[56] References Cited

U.S. PATENT DOCUMENTS

| | | |
|---|---|---|
| 5,031,104 | 7/1991 | Ikeda et al. . |
| 5,177,685 | 1/1993 | Davis et al. . |
| 5,197,009 | 3/1993 | Hoffman, Jr. et al. . |
| 5,206,811 | 4/1993 | Itoh et al. .......................... 340/990 X |
| 5,272,638 | 12/1993 | Martin et al. . |
| 5,291,412 | 3/1994 | Tamai et al. ....................... 340/990 X |
| 5,475,598 | 12/1995 | Fushimi et al. . |
| 5,486,822 | 1/1996 | Tenmoku et al. . |
| 5,502,640 | 3/1996 | Yagyu et al. . |
| 5,508,930 | 4/1996 | Smith, Jr. . |
| 5,521,826 | 5/1996 | Matsumoto . |
| 5,544,060 | 8/1996 | Fujii et al. . |
| 5,559,511 | 9/1996 | Ito et al. . |

FOREIGN PATENT DOCUMENTS

| | | |
|---|---|---|
| 0 323 229 | 7/1989 | European Pat. Off. . |
| 0 372 840 | 6/1990 | European Pat. Off. . |
| 0 534 755 | 3/1993 | European Pat. Off. . |
| A-0 547 548 | 6/1993 | European Pat. Off. . |
| A-0 583 773 | 2/1994 | European Pat. Off. . |
| A-2 079 453 | 1/1982 | United Kingdom . |
| WO-A-93 13385 | 7/1993 | WIPO . |

*Primary Examiner*—William A. Cuchlinski, Jr.
*Assistant Examiner*—Edward Pipala
*Attorney, Agent, or Firm*—Burns, Doane, Swecker & Mathis, LLP

[57] ABSTRACT

A vehicular navigation system includes a present-position sensing unit (2), an information storage unit (3), input/output means (1) for entering a destination and a transit point, designating execution of a route search from the present position sensed by the present-position sensing unit to the destination or the transit point, and a central processor (4) having route searching means for performing a route search from the present position to the destination or transit point, route storage means for temporarily storing a route that has been found, route-guidance control means which outputs a signal for performing route guidance, and route travel determination means for determining whether the present position of the automotive vehicle is on the suggested route. When execution of a route search is designated while the vehicle is traveling on the suggested route, a route different from the suggested route is retrieved.

7 Claims, 23 Drawing Sheets

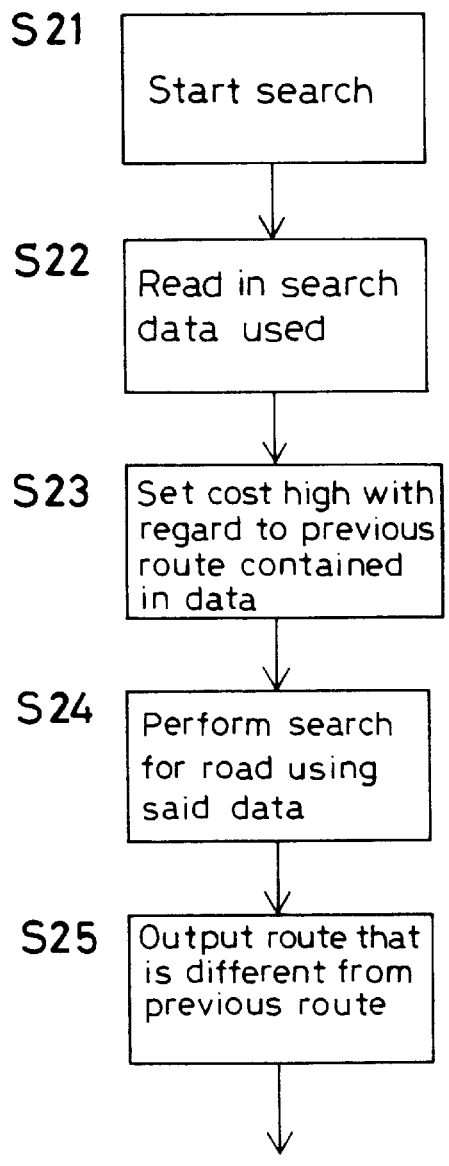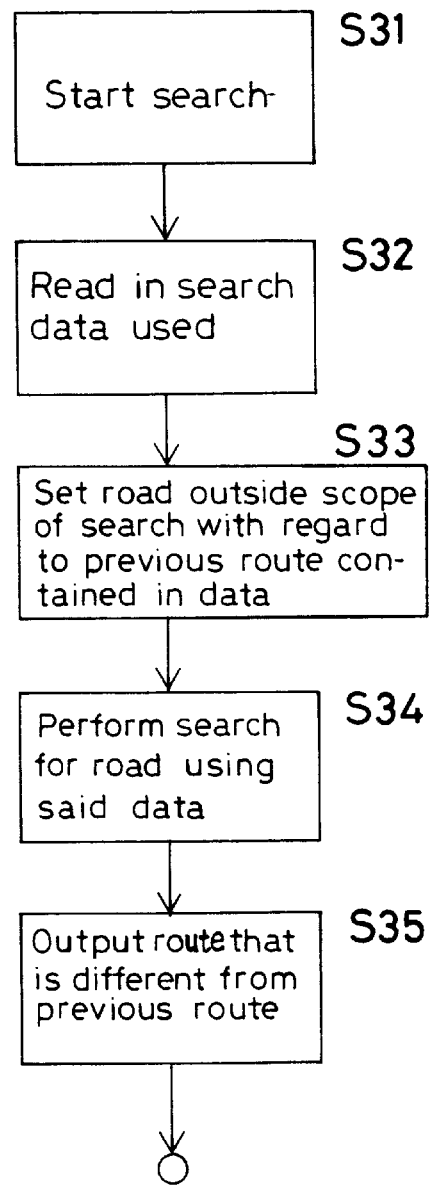

● : Connection points valid for search

○ : Connection points excluded from scope of search

| | ① No particular designation made | ② Shortest time | ③ Ease of travel |
|---|---|---|---|
| Road classification coefficient | 1 | 1 | 2 |
| Road width coefficient | 1 | 1 | 2 |
| Left-right turn coefficient | 1 | 2 | 2 |
| Signal coefficient | 1 | 2 | 1 |
| Length coefficient | 1 | 2 | 1 |
| Vehicle velocity coefficient | 1 | 2 | 1 |

| Number of roads (11) | |
|---|---|
| Serial NO. | Road NO. |
| 1 | 1 |
| 2 | 3 |
| ⋮ | ⋮ |
| 5 | 10 |
| 6 | 12 |
| ⋮ | ⋮ |
| 9 | 19 |
| 10 | 20 |
| 11 | 21 |

← En-route location (Between No.5 and No.6)

NAVIGATION SYSTEM FOR VEHICLES WITH ALTERNATIVE ROUTE SEARCHING CAPABILITIES

BACKGROUND OF THE INVENTION

This invention relates to a vehicular navigation system in which it is possible to search for an alternative suggested route when the vehicle is currently traveling on an already set suggested route.

A vehicular navigation system searches for a route from the present position of the vehicle to the destination and provides route guidance based upon the route found, thereby reducing the burden upon the driver when the vehicle is traveling on unfamiliar roads. To accomplish this, the vehicular navigation system has a function by which a route from the present position to the destination is retrieved in response to entry of the destination. The route found is displayed. The vehicular navigation system also has a function for detecting the present position of the vehicle and displays the present position along with the retrieved route to thereby provide route guidance.

In such a system which provides a unique route to the destination, a suggested route that is to the driver's liking is not always provided. More specifically, there are instances in which the driver does not wish to travel the initially retrieved route because the route would compel the driver to pass through a congested urban area. For example, in a vehicular travel guidance system disclosed in the specification of Japanese Patent Application Laid-Open No. 5-165407, a plurality of routes are found successively in accordance with a ranking that depends upon the cost of the line segment from the departure point to the destination set on a road map on the basis of digital map data. In order that other routes that differ from a previously found route may be found one after another, processing that raises the apparent cost of the line segment in the found route is executed, then a route for which the cost of the line segment is minimum is found, thereby making it possible to find and select a route that is an alternative to a route found earlier.

This vehicular travel guidance system is effective in a case where congested road conditions are already known at the time a route from the departure point to the destination is found. However, when an attempt is made to deal with a case in which the driver wishes to travel on another route owing to unexpected heavy traffic or road construction encountered during travel on a route, a destination must be set again using the present location as the starting point, a route to the destination must be found or another route must be found and selected in the manner mentioned above to bypass the congested section or the section under construction. Further, there are cases where an alternative route is searched for because a section of road is predicted to be congested as usual and cases where there is no congestion and the alternative route is the one having heavy traffic. In such cases a destination must still be set again in order to find another route, a route to the destination must be found or another route must be found and selected in the manner mentioned above to bypass the congested section or the section under construction.

Furthermore, another method that has been considered to deal with a case in which a section having heavy traffic or construction is encountered is to perform a search again upon deliberately departing from an initially set route, thereby bypassing the congested section of road or the road under construction. According to this function for performing a re-search, a route connecting to the already set suggested route from the present position of the vehicle is searched for when it is sensed that the vehicle has departed from the suggested route at such time that the vehicle is traveling along the already set suggested route. There are cases in which the congested section or the section under construction can be bypassed by using this function. However, in a case where the suggested route is deliberately departed from and the search is performed again, a route which connects to the already set suggested route is not always found and sometimes the route which the vehicle has entered is a dead end. In such case the search must be performed again upon driving the vehicle in a different direction from the route on which the vehicle is presently located. Further, even if the route can be connected to the route already set, the location of the connection may be in a section of heavy traffic or in a section under construction and therefore the route that is retrieved does not always make it possible to bypass such a section of road.

In the system which provides a unique route to the destination, a detour or roundabout road or a course desired to be traversed cannot be set in transit and it is difficult to make a course setting that is in line with the wishes of the driver.

Accordingly, a navigation system disclosed in the specification of Japanese Patent Application Laid-Open No. 2-3899 has an input unit for entering route information comprising a starting point, a destination and information indicating a transit location which the driver desires to traverse. Data in a recording unit that has recorded position data and road information entered from the input unit is processed in accordance with a navigation program and then outputted to a display unit. This makes it possible for the driver to designate the transit location desired to be traversed and to set the desired course. As a result, it is possible to provide route guidance in line with driver preference.

With a conventional navigation system of this kind, an en-route location desired to be traversed can be set but the route passing through this set location is still searched for and displayed. Accordingly, if the vehicle leaves the retrieved route before passing through the desired en-route location, the route to this location is not displayed; only the route to the final destination is displayed even if the driver wishes at all cost to pass through the location desired to be traversed.

Of course, if there is such an en-route location which the driver wishes to traverse at all cost, this location can be adopted as a provisional destination, the final destination can be entered after this location is reached and the search may then be performed. However, such an operation is troublesome for the driver to perform. In order to solve this problem, the applicant has proposed a vehicular navigation system in Japanese Patent Application Laid-Open No. 6-66587. This system is such that when an en-route location desired to be traversed has been set, guidance for a route that passes through this location is provided in reliable fashion. En-route location processing executed by this vehicular navigation system will be described below.

FIG. 1 is a diagram for describing the flow of processing for route guidance, and FIG. 2 is a diagram for describing processing for judging whether an en-route location has been traversed.

In route guidance, as illustrated in FIG. 1, first guidance is provided by a screen display or voice track in accordance with results of a search performed from the starting point to the en-route location (transit point) (step S401). The route to the en-route location is displayed on the screen by a red line, and the route from the en-route location to the destination is displayed in the form of a blue line. Next, it is determined whether the en-route location (transit point) has been traversed (step 402). If it is determined that the en-route location has been traversed, then en-route location traversal processing is executed (step S403) and the system changes over to route guidance for a route from the en-route location to the destination (step S404).

In the processing for determining whether the en-route location has been traversed, first it is determined whether the vehicle is traveling on the designated route (step S501), as shown in FIG. 2. If the vehicle is traveling on the route, it is determined whether the remaining distance to the en-route location on the route is less than a prescribed distance (200 m, for example) (step S502). If the distance is less than the prescribed distance (200 m), then it is decided that the en-route location has been passed. If the vehicle is not traveling on the route, on the other hand, it is determined whether the straight-line distance from the present position to the en-route location is less than a prescribed distance (200 m, for example) (step S503). If the straight-line distance is less than the prescribed distance (200 m), then it is decided that the en-route location has been passed.

In the system described above, however, the en-route location is either traversed with certainty or otherwise a decision regarding the en-route location will not be obtained unless a location within a distance corresponding to the en-route location is traversed. Consequently, if, when the driver wishes to set a desired route, an en-route location capable of being designated does not exist on this route, e.g., when the driver has set a station as the en-route location because the driver desires to take a road that passes in front of the station, as shown in FIG. 22A, it is judged that the en-route location has been traversed, and guidance to the destination can be received, so long as the road in front of the station resides in a range that is within the prescribed distance from the station. However, if the road in front of the station does not reside in the range within the prescribed distance, a decision to the effect that the en-route location has been passed is not obtained and guidance to the en-route location continues. In other words, in a case where a location just off a desired route can be designated as an en-route location in such a manner that the desired route can be selected, the driver does not actually intend to pass through the en-route location but the conventional system is such that the driver cannot receive guidance to the destination unless the en-route location is passed. Thus, with the conventional system described above, it cannot be arranged to receive route guidance conveniently by designating a so-called nearby dummy location as an en-route location.

SUMMARY OF THE INVENTION

Accordingly, an object of the present invention is to make it possible to readily search for a suggested route other than a currently prevailing suggested route even when the vehicle is traveling on the suggested route already set.

Another object of the present invention is to automatically provide guidance to a destination without passing through an en-route location even if a point in the vicinity of the desired route has been set as the en-route location.

According to the present invention, the first-mentioned object is attained by providing a vehicular navigation system for providing route guidance automatically in accordance with a route set in advance, the system comprising, as shown in FIG. 3, a present-position sensing unit A11 for measuring the present position of an automotive vehicle, an information storage unit A12 in which map information and route information has been stored, an input unit A21 for entering a destination and a transit point and designating execution of a route search from the present position sensed by the present-position sensing unit A11 to the destination or the transit point, notification means A22 for outputting information for the purpose of route guidance, and a central processing unit A14 having route searching means A16 for performing a route search from the present position to the destination or transit point in response to the designation of route search made by the input unit A21, route memory means A17 for temporarily storing a route found by the route searching means A16, route-guidance control means A18 for outputting, to the notification means A22, a signal for performing route guidance on the basis of the route stored, and route travel determination means A19 for determining whether the present position of the automotive vehicle sensed by the present-position sensing unit A11 is on the route stored in the route memory means A17, wherein when execution of a route search is designated by the input unit A21 in a case where it has been determined by the route travel determination means A19 that the automotive vehicle is traveling on the route, the route searching means A16 searches for a route different from the route, for which guidance is presently being given, stored in the route memory means A17.

In accordance with this aspect of the present invention constructed as set forth above, an alternative suggested route can be searched for in response to a request from the driver on a suggested route presently being traveled. This makes it possible to set a suggested route that conforms to the conditions of travel. For example, if a traffic jam occurs because of an accident or if road work is encountered along a suggested route and makes it difficult to travel on the suggested route, a search for a suggested route that is an alternative to the present suggested route can be carried out in simple fashion. As a result, it is possible to perform route guidance in line with driver preference in dependence with traveling conditions.

According to the present invention, the second-mentioned object is attained by providing a vehicular navigation system which, as shown in FIG. 4, comprises en-route location setting means B17 for setting a desired en-route location, present-position sensing means B15 for sensing the present position of an automotive vehicle, route searching means B18 for searching for a route to a destination via the set en-route location based upon map information stored beforehand in memory means B12 and present-position information sensed by the present-position sensing means B15, display means B21 for displaying the route found by the route searching means B18 as well as the present position of the vehicle, and en-route location traversal determination means B20 for determining whether the vehicle has passed through the en-route location by comparing position information indicative of the sensed present position of the vehicle and position information indicative of the en-route location, wherein the en-route location traversal determination means B20 has first judging means for judging whether the sensed present position of the vehicle is on a suggested route from the en-route location to the destination, it being judged that the en-route location has been passed through if the present position of the vehicle is on the suggested route.

In accordance with this aspect of the present invention constructed as set forth above, route guidance to a destination can be provided automatically without passing through an en-route location in a case where the en-route location has been set in order to set a desired route, such as when the vicinity of the en-route location is detoured owing to road construction or the like, or in a case where a location not planned to be traversed originally is set as an en-route location in a setting operation and then a route is set.

Still other objects and advantages of the invention will in part be obvious and will in part be apparent from the specification.

The invention accordingly comprises the features of construction, combinations of elements and arrangement of parts hereinafter set forth, and the scope of the invention will be indicated in the claims.

BRIEF DESCRIPTION OF THE DRAWINGS

FIG. 11 is a flowchart of processing for finding and outputting an alternative route upon setting a high cost for a route presently being suggested;

FIG. 12 is a flowchart of processing for finding and outputting an alternative route upon making a setting in such a manner that the cost of a route presently being suggested is excluded;

DESCRIPTION OF THE PREFERRED EMBODIMENTS

Figure 1:
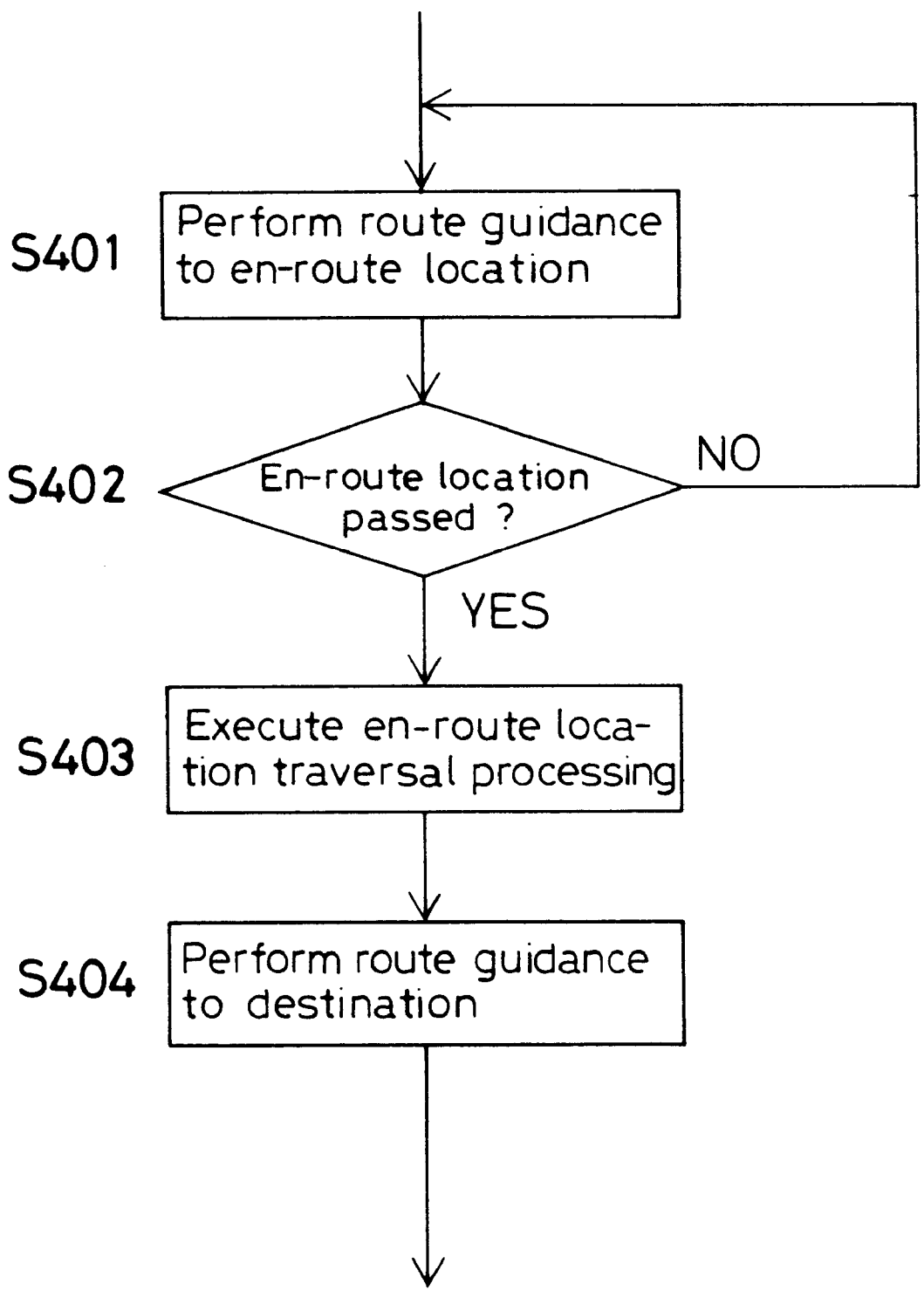
FIG. 1 is a diagram for describing the flow of processing for route guidance.
Figure 2:
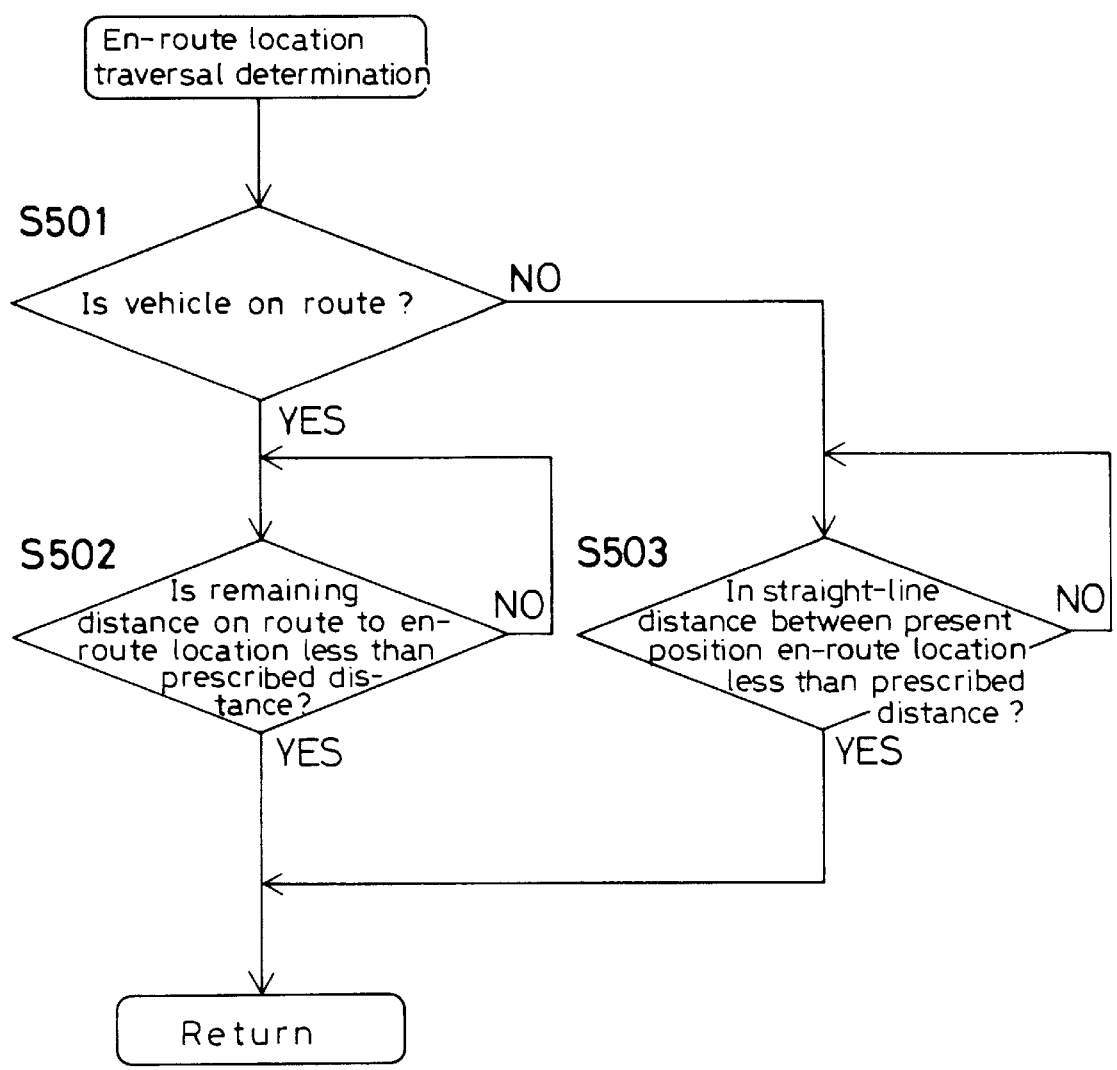
FIG. 2 is a diagram for describing the flow of processing for judging traversal of an en-route location according to the prior art.
Figure 3:
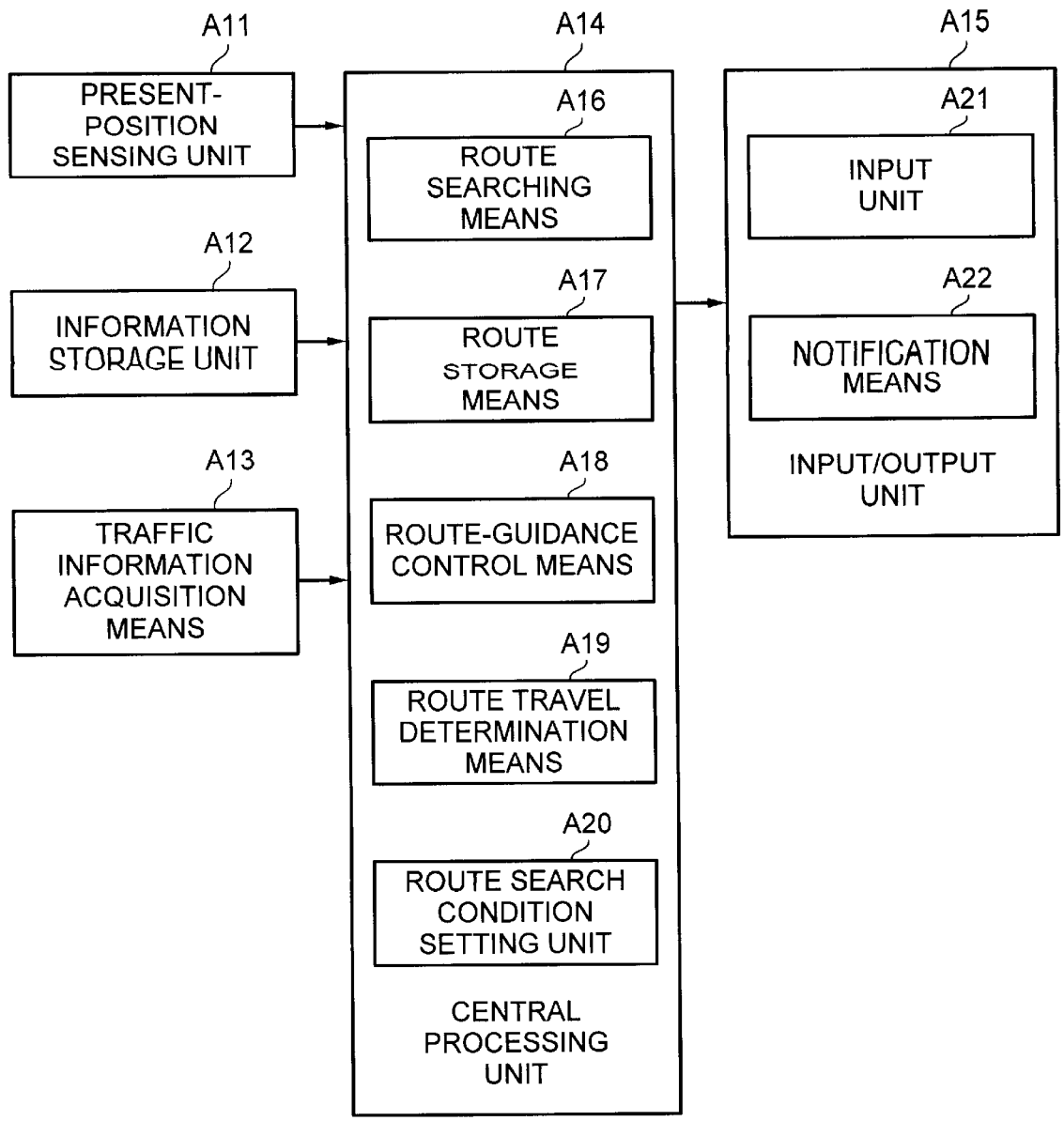
FIG. 3 is a block diagram showing a first construction of a system according to the present invention.
Figure 4:
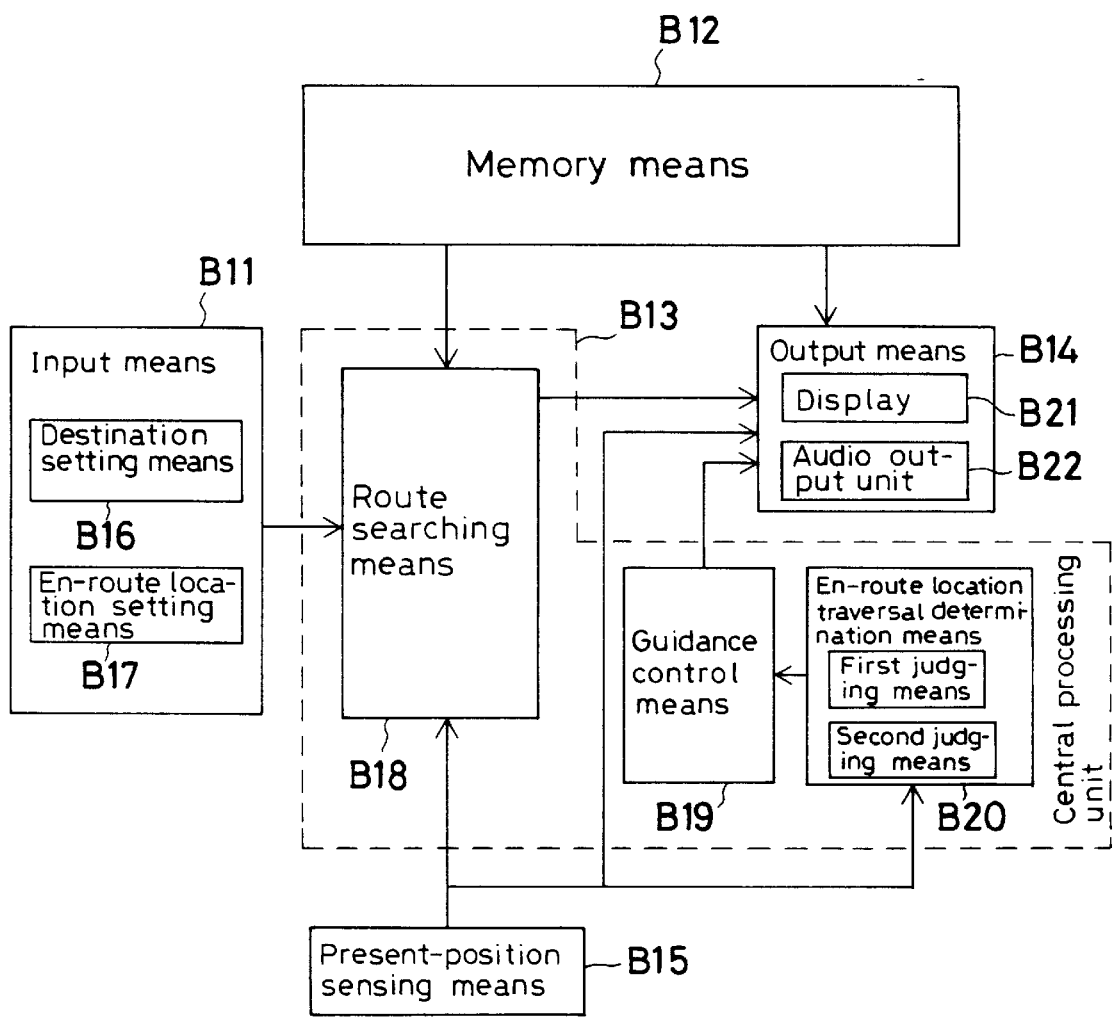
FIG. 4 is a block diagram showing a second construction of a system according to the present invention.
Figure 5:
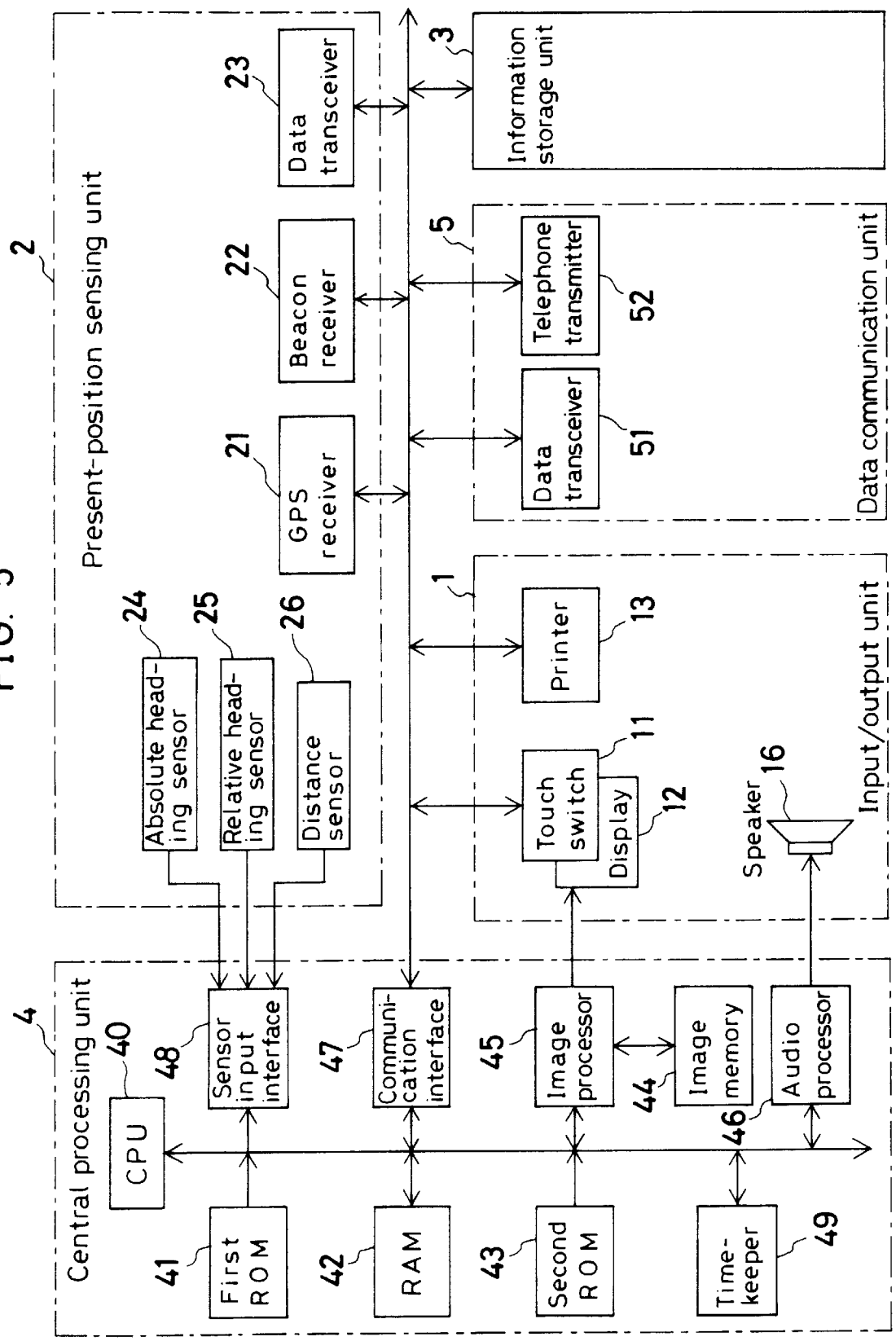
FIG. 5 is a diagram showing a first embodiment of the overall arrangement of a vehicular navigation system according to the present invention.

As shown in FIG. 5, a navigation system according to the present invention comprises an input/output unit 1 for input/output of information relating to route guidance, a present-position sensing unit 2 for sensing information relating to the present position of an automotive vehicle, an information storage device 3 in which navigation data necessary for route calculation and display guidance data necessary for instructional guidance have been recorded, and a central processor 4 for executing route finding processing, display guidance processing necessary for route guidance, and control of the overall system.

The input/output unit 1 functions to enter destinations, to allow the driver to instruct the central processor 4, at the volition of the driver, to execute navigation processing in such a manner that guidance information can be outputted by voice and/or a screen display when required by the driver, and to print out processed data or data for communication purposes. As means for implementing these functions, the input section of the input/output comprises a touch switch 11 for entering a location in the form of a telephone number or coordinates in order to set a location such a destination or transit point, for requesting route guidance and for setting and changing over mode. The output section has a display 12 for displaying input data on a screen and, moreover, for automatically displaying route guidance on the screen in response to a request from the driver, a printer 13 for printing out data processed by the central processor 4 and data stored in the information storage device 3, and a speaker 16 for outputting route guidance by voice.

The display 12 is constituted by a color CRT or color liquid-crystal display device. On the basis of map data and guidance data processed by the central processor 4, the display 12 outputs, as a color display, all screens necessary for navigation, such as a route setting screen, a screen of an interval view and a screen of intersections. The display 12 also displays buttons for setting route guidance and for changing over guidance and screens during the route instruction. In particular, transit-intersection information such as the names of intersections to be traversed is displayed in color in the form of a pop-up menu on the interval_view when required.

The display 12 is provided inside the instrument panel in the vicinity of the driver's seat. Observing an interval view enables the driver to ascertain the present location of the vehicle and to obtain information regarding a route from this location. The display 12 is provided with the touch panel 11 that corresponds to the display of function buttons. The operations described above are executed based upon signals entered by touching the function buttons. Several key switches are provided at the periphery of the screen. The arrangement is such that pressing a key switch executes mode changeover to a guidance mode or destination setting mode. Input signal generating means constituted by the key switches and touch switches 11 constructs the input section.

The present-position sensing unit 2 has a GPS receiver 21 which utilizes a global positioning system (GPS), a beacon receiver 22, a data transceiver 23 for receiving a GPS correction signal utilizing a cellular phone or FM multiplex signal, an absolute heading sensor 24 constituted by a geomagnetic sensor or the like, a relative heading sensor 25 constituted by a wheel sensor, steering sensor or gyro, etc., and a distance sensor 26 for sensing traveling distance from the number of revolutions of a wheel.

The information storage device 3 is a data base in which all data is recorded, the data being map data required for route guidance, intersection data, node data, road data, photographic data, destination data, guidance-location data, detailed destination data, road name data, branch point data, address data, display guidance data and voice guidance data, etc. The data base is constituted by a recording medium, such as a CD-ROM, capable of being optically read.

The central processor 4 comprises a CPU 40 for executing processing; a first ROM 41 in which are stored a program for executing processing such as route finding, a program for control of display output needed in route guidance and for control of audio output needed in voice guidance, and data required by these programs; a RAM 42 for temporarily storing retrieved route guidance information and data which is in the course of being processed; a second ROM 43 in which display information data necessary for displaying route guidance and maps is stored; an image memory 44 in which image data used to display a screen on the display unit is stored; an image processor 45 which, on the basis of a display-output control signal from the CPU 40, extracts image data from the image memory 44 and delivers the data to the display upon subjecting it to image processing; a audio processor 46 which, on the basis of an audio-output control signal from the CPU, combines audio, phrases, single sentences and sounds read out of the information storage device 3, converts the result to an analog signal and delivers the analog signal to the speaker 16; a communication interface 47 for performing an exchange of input/output data by communication; a sensor-input interface 48 for accepting a sensor signal from the present-position sensor 2; and a timekeeper 49 for entering date and time into internal dialog information. Route guidance is performed in the form of a screen display and audio output. The arrangement is such that the driver can select whether the audio output is produced or not.

A data communication unit 5 accumulates a large quantity of route guidance information and transmits/receives data to/from an external information center for, say, a VICS (Vehicle Information & Communication System, which is a traffic information and communication system utilizing beacons or FM multiplexing), or an ATIS (Advanced Traffic Information System, which is a system for obtaining traffic information utilizing telephone lines) provided in response to a user request, and allows the user to store destination information or individual information in an information storage medium (digital data memory means) such as an electronic organizer or IC card in advance. The data communication unit 5 has a data transceiver 51 which performs transmits/receives data for entering location coordinates using this information, and a telephone transmitter 52 which automatically implements a telephone transmission for designating a location and acquiring information concerning the surroundings of the location or a telephone transmission for establishing a telephone connection with a destination after the destination has been set.

Figure 6:
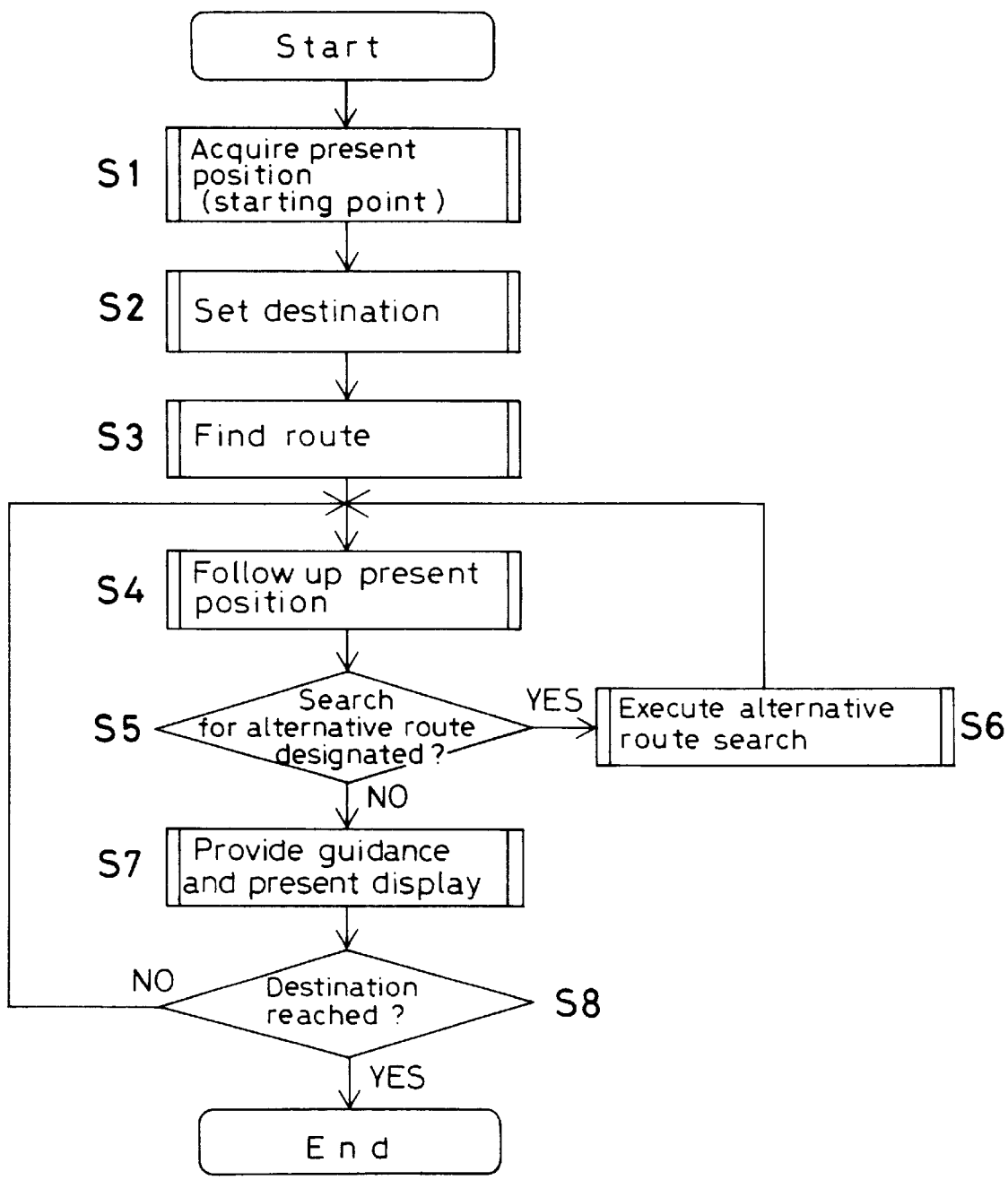
FIG. 6 is a diagram showing the flow of processing of the overall system.

FIG. 6 is a flowchart showing the flow of overall processing of the system. First, the present position (starting point) necessary for finding a route is acquired (step S1). Next, conditions for setting a destination are entered via the input unit using the destination setting screen, thereby setting a destination (step S2). A search for the route is then executed by route searching means (step S3). When a guidance start key on the input unit is pressed on the found route to start route guidance, the position of the vehicle is measured by present-position sensing means and the present position of the vehicle is followed (step S4). Next, whether a signal instructing a search for an alternative route has been entered via the input unit is detected (step S5). If the signal instructing a search for an alternative route has been entered, then processing for the search of the alternative route is executed by route searching means (step S6). If the signal instructing a search for an alternative route has not been entered, then instructional guidance continues to be provided by voice and/or display output from notification means based upon a signal outputted by route-guidance control means in accordance with the route that has been set (step S7). Further, distance from the present position to the destination is calculated and arrival at the destination is judged based upon whether this distance has become less than a predetermined distance (step S8). If the distance has become less than the predetermined distance, arrival at the destination is judged to have occurred and route guidance is terminated. On the other hand, if the distance from the present position to the destination has not become less than the predetermined distance, the program returns to step S4 and follow-up of the present position continues. It should be noted that detection of the input of the signal instructing the search for an alternative route is performed by timer interrupt processing.

Processing for searching for an alternative route indicated at step S6 in FIG. 6 will now be described in detail.

Figure 7A:
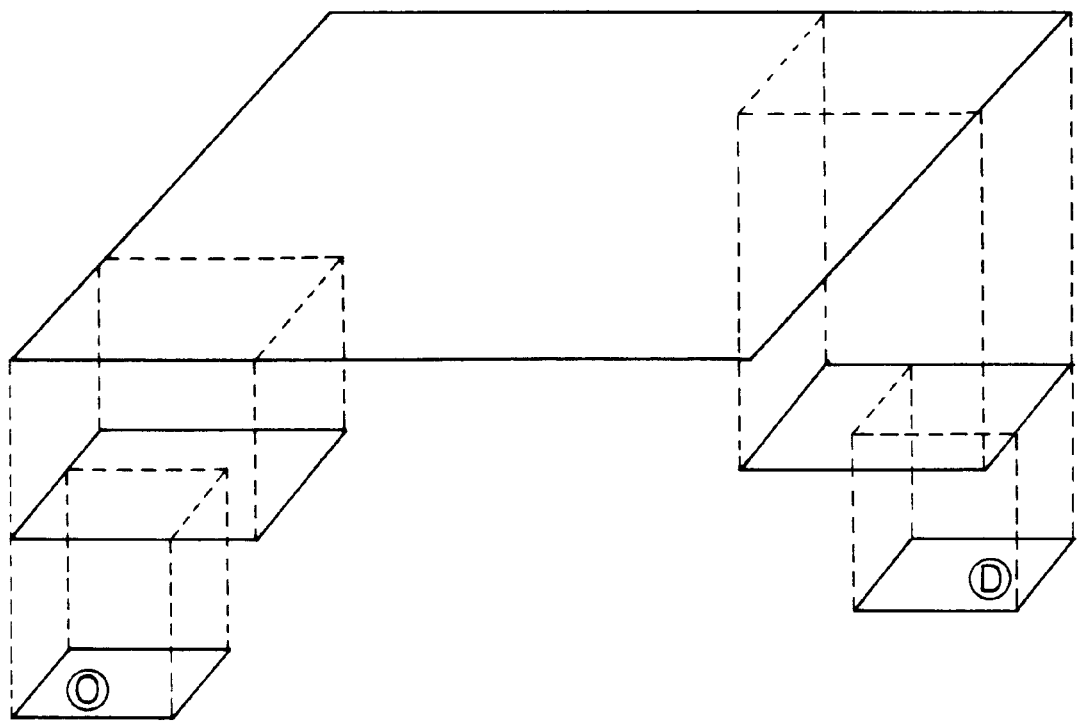
FIGS. 7A and 7B are diagrams illustrating a search range in an initial search from a present position to a destination in a general case, with the search being made upon entry of a location such as the destination.
Figure 7B:
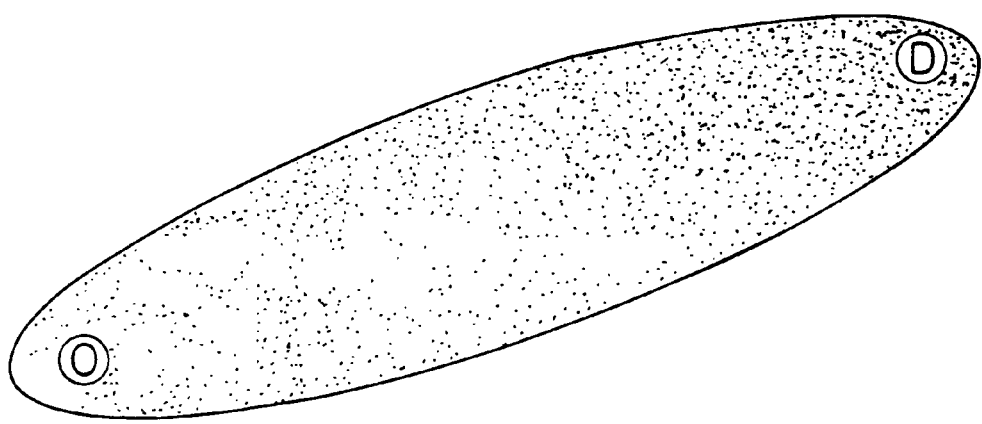
Figure 8A:
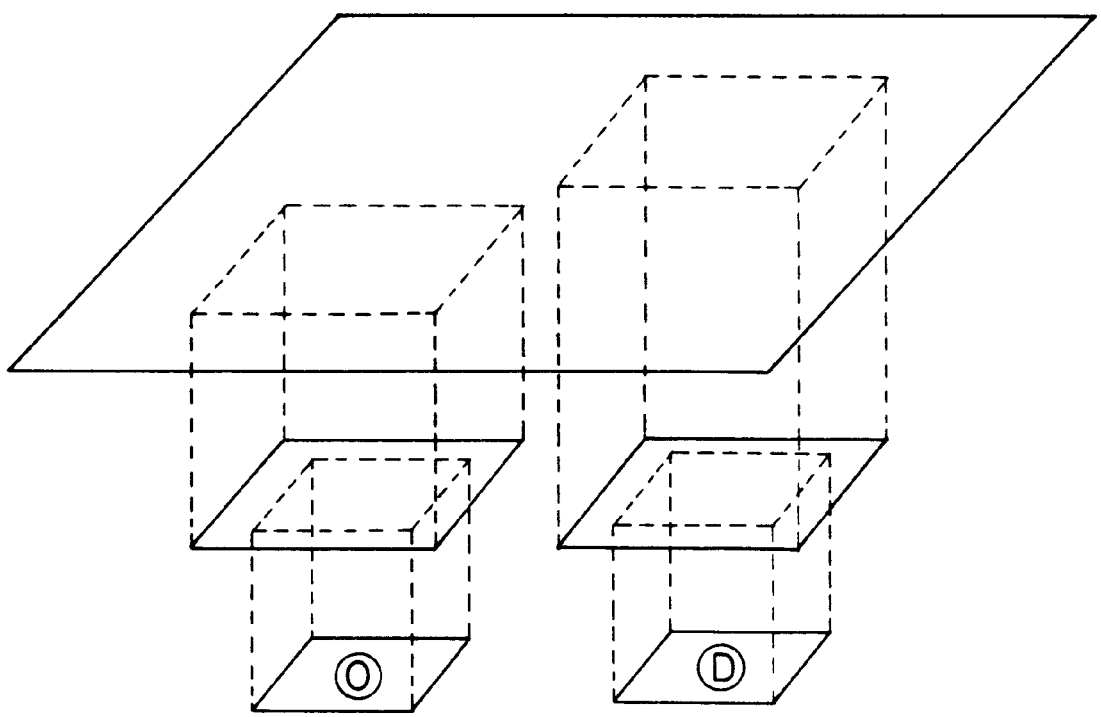
FIGS. 8A and 8B are diagrams showing the range of a search for an alternative route at the time of route guidance for a route initially found in FIG. 7.
Figure 8B:
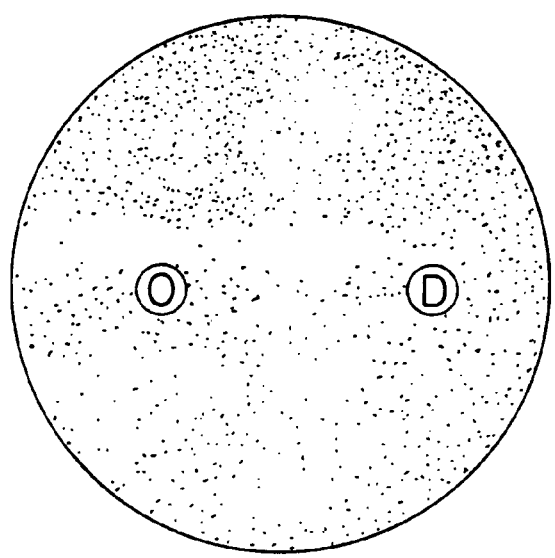

When the range of an initial search is expressed schematically, road density or the like is classified hierarchically by local road, principal road and trunk road, whereby map information is obtained in the form of a hierarchical structure. By connecting map information to higher-order hierarchical levels in block units from a present position 0 in the direction of a destination D and from the destination D in the direction of the present position 0, an elliptical range of the kind shown in FIG. 7B becomes the area of the search. In the present invention, however, when the range of a search is expressed schematically in a case where a search for an alternative route has been designated during travel along a suggested route, a circular range of the kind shown in FIG. 8B is made the area of the search by connecting map information to higher-order hierarchical levels in block units centered about the present position 0 and destination D, respectively. In FIG. 8B, the range is expressed as a circle but the range need not necessarily be circular. In order to search for a route that is as different as possible from the route presently being traveled on, the search at the time of an alternative-route search is made wider than the range of the ordinary search range shown in FIG. 7B and the search is performed in this range.

The navigation system according to the present invention in such that a location such as a destination or transit point is set, a route is found and route guidance is executed based upon this route. Various data indicative of roads and branch points stored in a memory unit in advance includes road width, road classification such as expressway, national road or prefectural road, traffic signal waiting time at intersections, road restrictions such as roads for which entry is prohibited and roads which are one-way, and degree of road congestion, these being put into the form of data in advance. Cost is assigned on the basis of such a variety of information. When the initial search for a route is performed, a suggested route is calculated based on these costs so as to minimize cost, by way of example. In a case where search for an alternative route has been designated by the input unit during travel on a route decided by the initial search, a route different from the present route is computed again and displayed in the manner described above in the route searching means.

Figure 9:
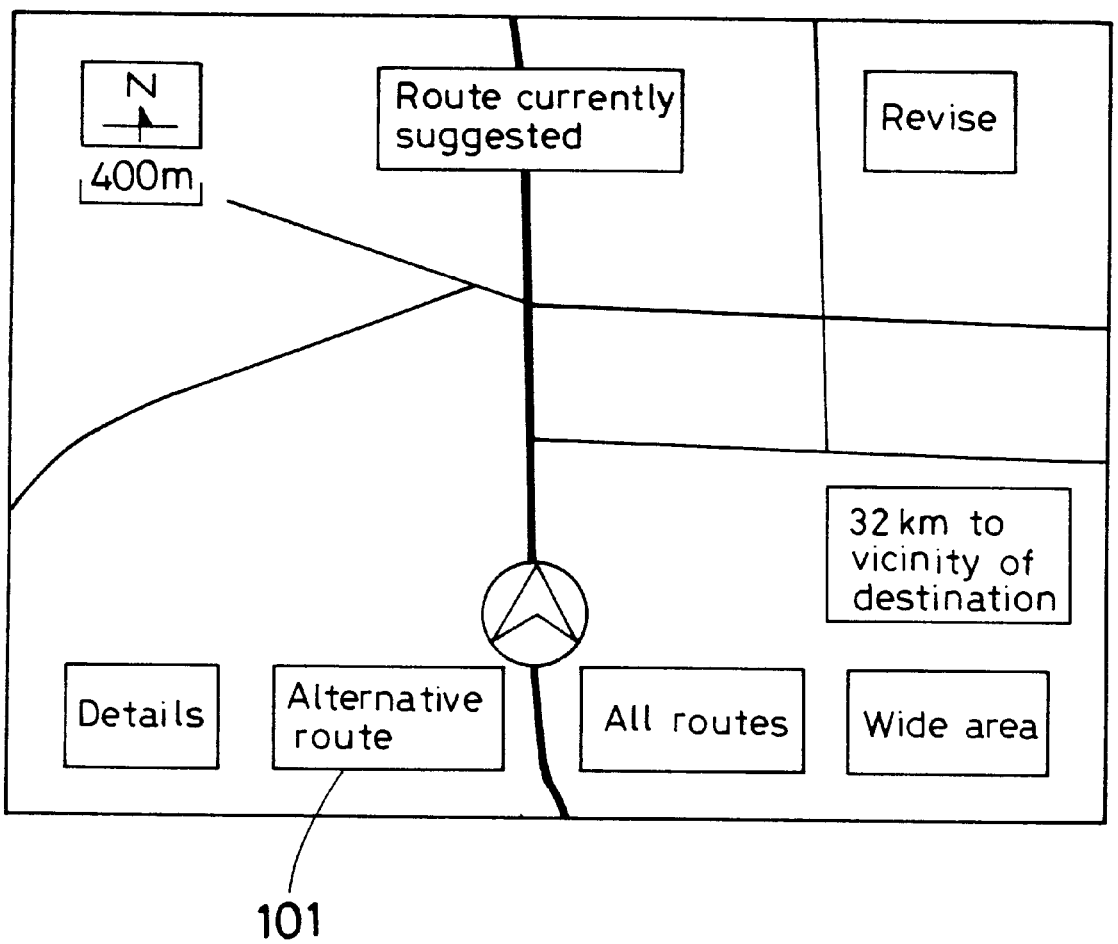
FIG. 9 is a diagram showing an example of a screen display for a case in which an alternative-route search key is provided during route guidance.

In the search for an alternative route, the user may wish to traverse a different route off a currently suggested route during travel along the initially found route indicated by the bold line in FIG. 9. An "ALTERNATIVE ROUTE" key 101 is provided at all times. By pressing the "ALTERNATIVE ROUTE" key 101 in such case, it is possible to find a route that will be least likely to pass the currently suggested route. An execute key for executing the search for this alternative route may be made the same as "RE-SEARCH" key displayed in a case where the vehicle departs from the route, by way of example.

Figure 10:
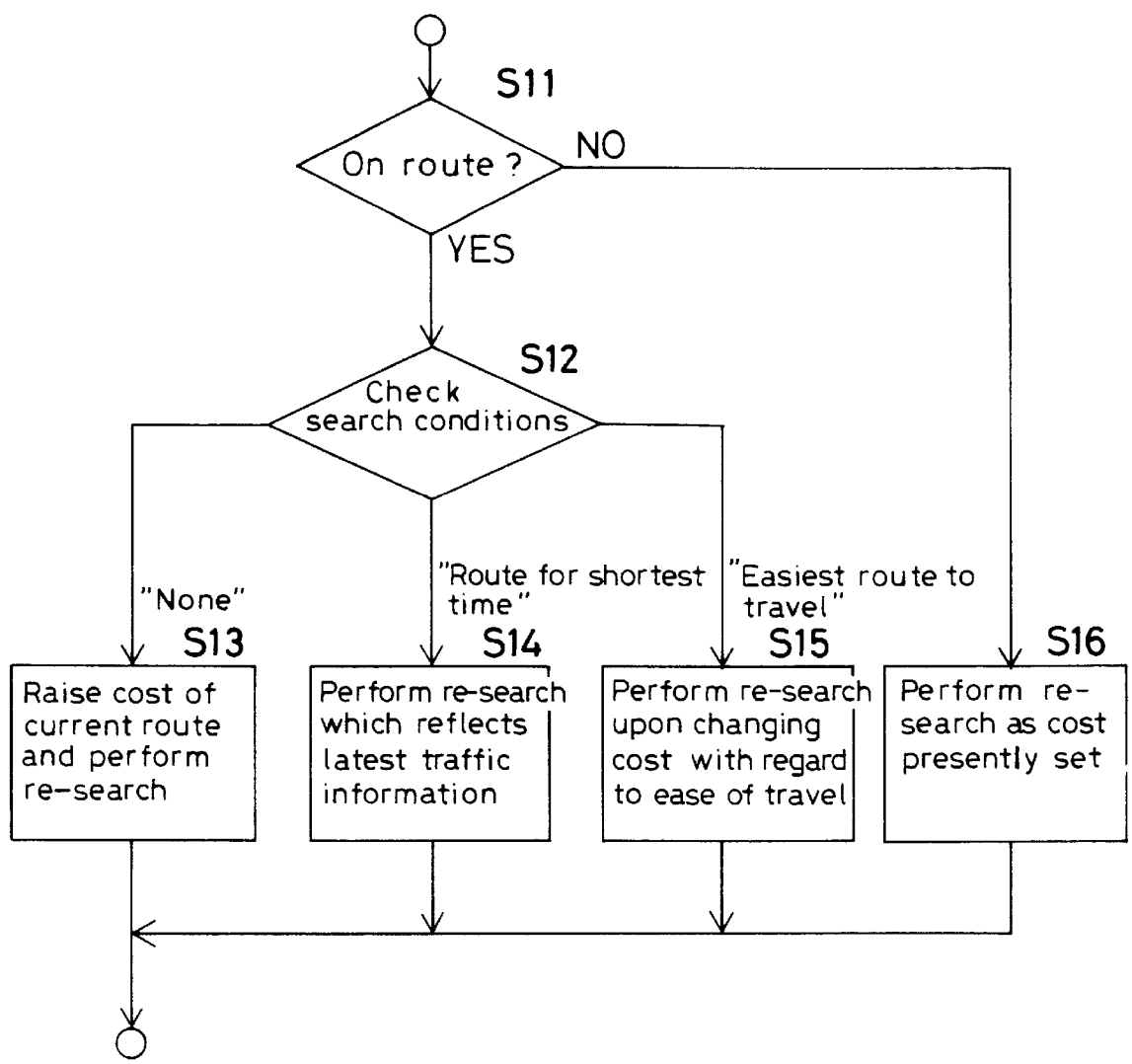
FIG. 10 is a flowchart illustrating a method of calculating an alternative route that is different from a present route.
Figure 17:
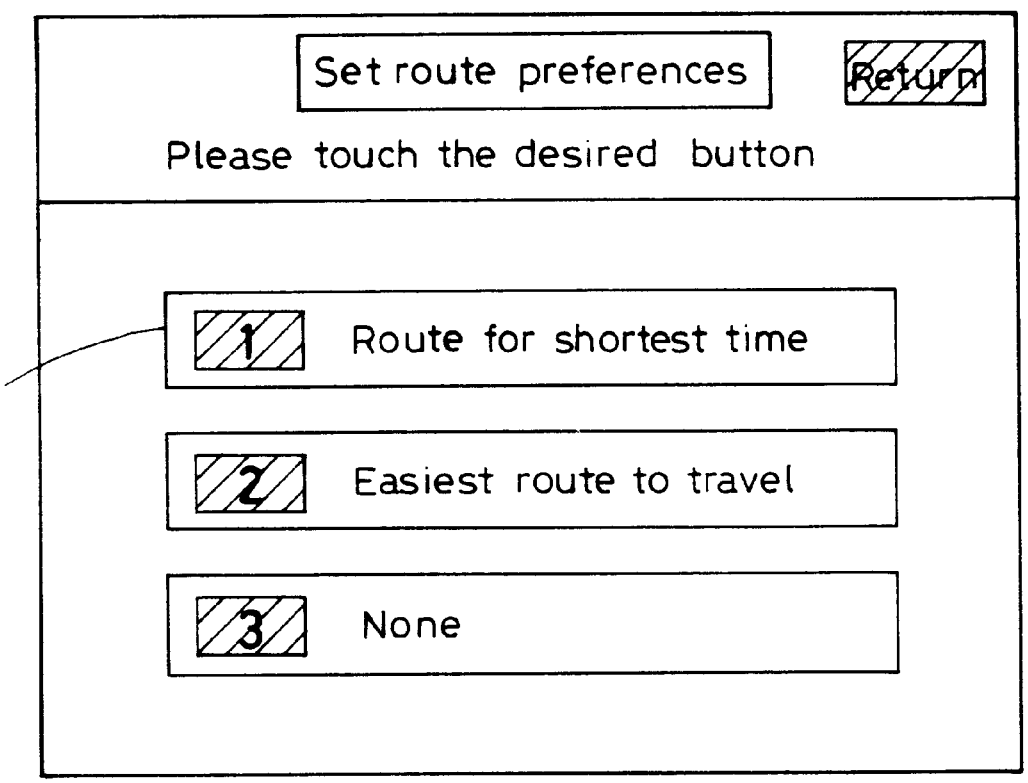
FIG. 17 is a diagram showing a screen for setting search conditions.

As shown in FIG. 10, a route is decided by an initial search and route guidance is executed based upon this route. However, when a search for an alternative route is designated by the input means, it is determined by the route travel determination means whether the vehicle is traveling on the route currently being suggested (step S11). If the vehicle is traveling on this route, the search conditions set by route search-condition setting means are checked (step S12). By pressing any one of selection keys 102 on the screen shown in FIG. 17, the user can set the search conditions by selecting the particular preference. The screen shown in FIG. 17 is displayed when the "ALTERNATIVE ROUTE" key 101, for example, is pressed in FIG. 9. If a designated search condition is "NONE", the cost of the road data and branch-point data of the initially found route currently being displayed is increased and a search for an alternative route is executed (step S13). More specifically, in a case where a search for an alternative route is designated during travel on a route, this is an indication that the user does not intend to take the road for which guidance is presently being given. By raising the cost of this currently suggested route even in a case where no particular conditions have been set, a search can be made for an alternative route that will not follow the currently suggested route to the greatest extend possible. In the operation for raising the cost of a currently suggested route in this case, a constant number may be added onto the cost of the road data or branch-point data of the currently suggested route or this data may be multiplied by the constant number. Alternatively, with regard to a route currently being suggested, the cost of road information or branch-point information for roads or branch points lying ahead of the vehicle position prevailing when the alternative-route search is designated can be made higher the nearer the vehicle is to the present position, with the cost being made closer to the original for points remote from the present position. If it is determined at step S12 that a designated search condition is "ROUTE FOR SHORTEST TIME", the latest traffic information is acquired from traffic information acquisition means and a re-search that reflects this traffic information is executed (step S14). Since the traffic information is acquired and a search for an alternative route is performed, traffic tie-up information and information such as passage limitations based upon construction can be incorporated, thus making it possible to find a route based upon the latest information. If it is determined at step S12 that a designated search condition is "EASIEST ROUTE TO TRAVEL", the cost concerning ease of travel is changed and then the search for an alternative route is performed (step S15). If it is determined at step S11 that the vehicle is not traveling the route currently being suggested, then the search for an alternative route is executed based upon the currently set cost (step S16).

Next, the specific processing indicated at step S13 in FIG. 10 will be described in detail, namely processing for performing an alternative-route search and outputting the alternative route upon setting a higher cost for the route for which guidance is currently being provided.

When start of search for an alternative route is designated by the input means during route guidance (step S21) in FIG. 11, data used in the search is read in from the memory unit (step S22). With regard to the data used in the search for an alternative route, all map data such as road data and branch-point data may be read in. In a case where various data for performing a search from the initial search range shown in FIG. 8B has been read in, the search range may be widened, as shown in FIG. 7B, and various data corresponding to this range may be read in. The cost of the road data or branch-point data of the route currently being suggested is set high (step S23). A method of setting the high cost for the data is to add a constant number to the cost of the road data or branch-point data of the currently suggested route or to multiply this data by the constant number. The search for a new road is performed by the route searching means based upon the cost of the search data thus set (step S24), a route different from the previous route is outputted to the notification means from the route-guidance control means and route guidance is performed by voice or display using the notification means.

When start of search for an alternative route is designated by operating the input means (step S31) in FIG. 12 in a case where a route search is performed upon excluding the currently suggested route from the scope of the search, the search data used is read in (step S32). The cost of the road data or branch-point data of the currently suggested route is made a maximum value and these items of data are set so as to exclude them from the scope of the search to the greatest extent possible (step S33). The reason for expressing a route as being outside the scope of the search but allowing the route to remain after raising its cost to the maximum value is that there are cases in which there is only one road in the vicinity of the destination and this route must be taken in order to reach the destination. When the cost of each item of data is set, a search for a new road is performed (step S34) and a route different from the whole is outputted by the route-guidance control means (step S35).

Next, with regard to a system in which road data is stored in memory in the form of a plurality of hierarchical layers based upon the classification of the road, a case will be described in detail in which the alternative-route search is performed and the alternative route outputted upon excluding connection points in each layer.

Figure 14A:
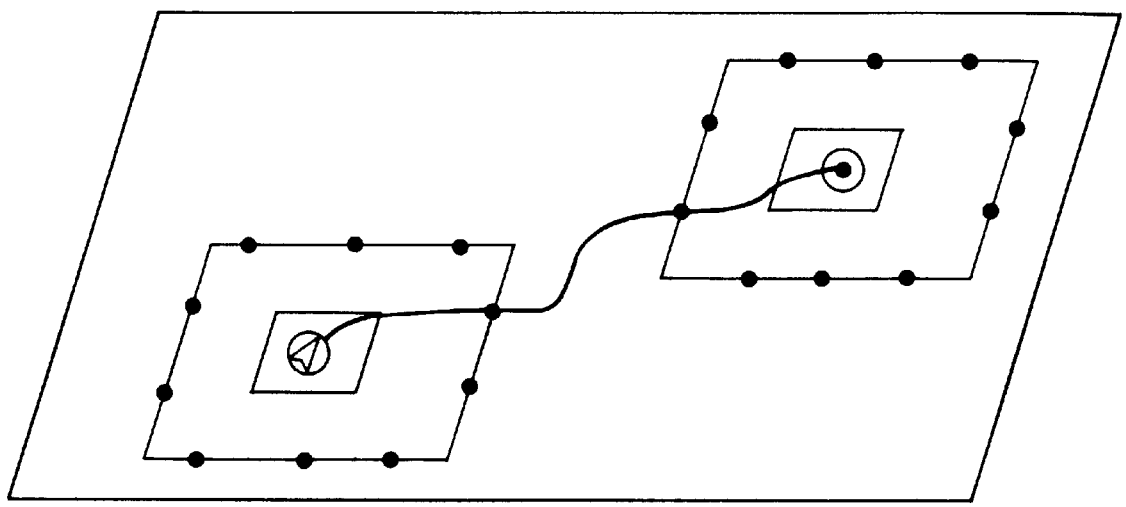
FIGS. 14A and 14B are diagrams for describing, in general terms, a case in which a search is performed upon excluding connection points of each hierarchical layer in a route presently being suggested.

In the hierarchical structure, map data comprising road data and branch-point data is partitioned into hierarchical layers in dependence upon degree of detail with the classification of the roads serving as a reference. More specifically, all road network data stored in the memory is planted in the lowermost layer, for example, and this serves as a detailed map. As the layer rises in the hierarchy, the detailed roads are excluded based upon the road classification so that the highest layer will have only expressways. The map data of each layer thus partitioned is stored upon being split into areas. When the processing of data such as search time is taken into account, the amount of data in each area of each layer should be as constant as possible. The lower the layer, the smaller the areas are set. The reason for this is that the lower the layer, the more dense the road data, with the map data being coarser in the higher layers. However, such a hierarchical structure does not impose a limitation upon the invention and various modifications can be made. Further, connection-point data for a transition between layers and for connecting mutually adjacent areas in the same layer is stored in the memory. The connection points may be intersections or road points not related to intersections. When map data is thus given a hierarchical structure and a search is performed under such conditions, the present location and the vicinity of the destination are retrieved in a lower layer in which the map density is dense. The closer the position is to a point midway between the present location and the destination, the higher the layer, in which the map data is dense, wherein the search is performed. A method of performing the search is to start the search from both the present location and the destination, for example, and conduct the search up to a connection point, which connects the layer presently being examined to a higher layer, upon taking into consideration the direction from the present location to the destination or from the destination to the present location in the layer being searched, or upon taking into consideration the cost of various data in a range that has already been set. A search is conducted from this connection point to the connection point of the next higher layer. In a case where this operation is repeated and a connection point from the side of the present location and a connection point from the side of the destination fall within the same layer, a search between the connection points is performed in this layer and a route is decided as shown in FIG. 14A. However, the method of the search in the hierarchical structure is not particularly limited to the above-described method. So long as data corresponding to connection points between layers is stored, various modifications are possible.

Figure 13:
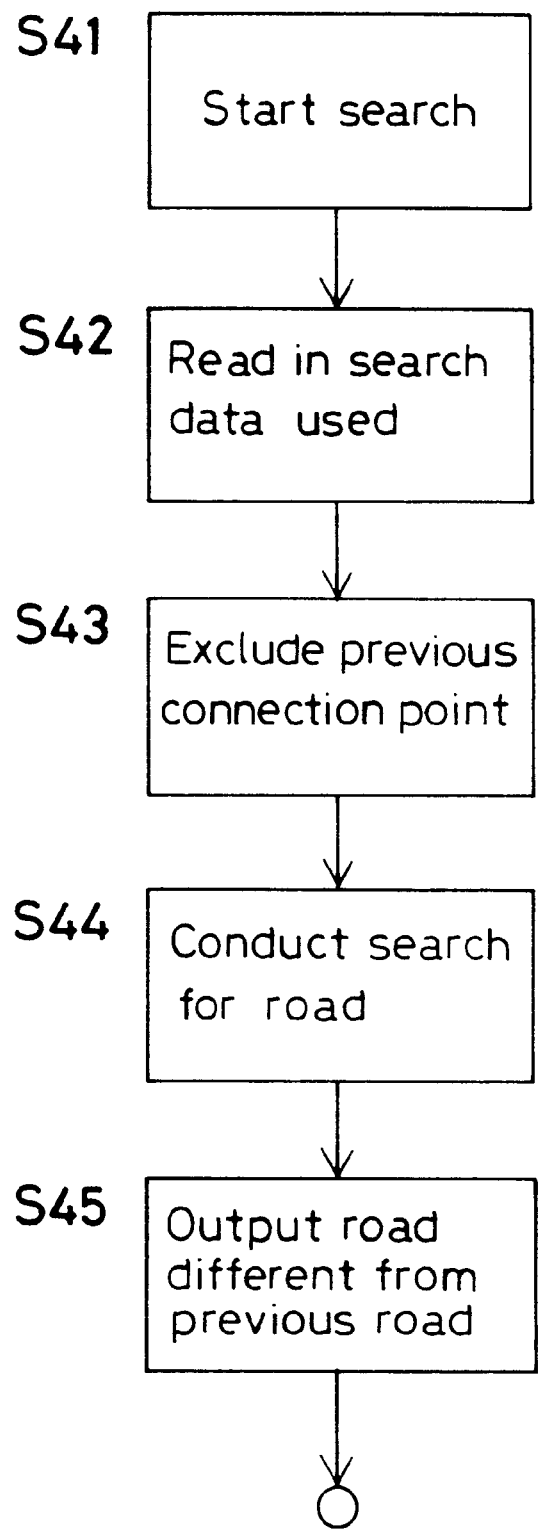
FIG. 13 is a flowchart of processing for finding and outputting an alternative route upon excluding connection points of each hierarchical layer in a route presently being suggested.
Figure 14B:
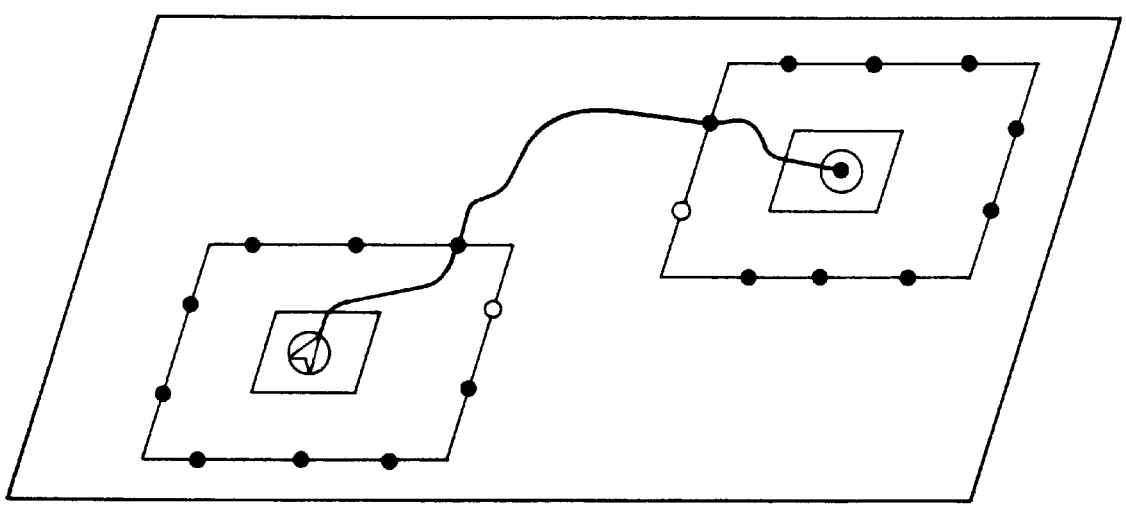

Processing for a case in which the search for a alternative route has been designated during route guidance regarding a route thus retrieved will be described in detail with reference to FIG. 13. When start of a search for an alternative route is designated by operating the input means during course guidance (step S41), the search data used is read in (step S42). Processing for excluding a connection point of the route currently being suggested is executed (step S43), as shown in FIG. 14B, a search for a new route is carried out (step S44) and route different from the previous route is outputted (step S45). A case in which a connection point of a route currently being suggested is excluded at step S43 has been described. However, an arrangement may be adopted in which data relating to cost is assigned to connection points in the same manner as road data and branch-point data, and the cost of a connection point on a route currently being suggested can be raised to the maximum value. Further, in a case where a connection point is excluded, only two connection points of the lowermost order may be excluded rather than excluding all connection points on a route currently being traveled. Connection points may be excluded preponderantly on the side of the present location.

A first embodiment will now be described in detail in which a search for an alternative route is conducted by selecting search conditions using the search-condition setting screen of the kind shown in FIG. 17 and changing the cost of road data or branch-point data.

Figures 15, 16:
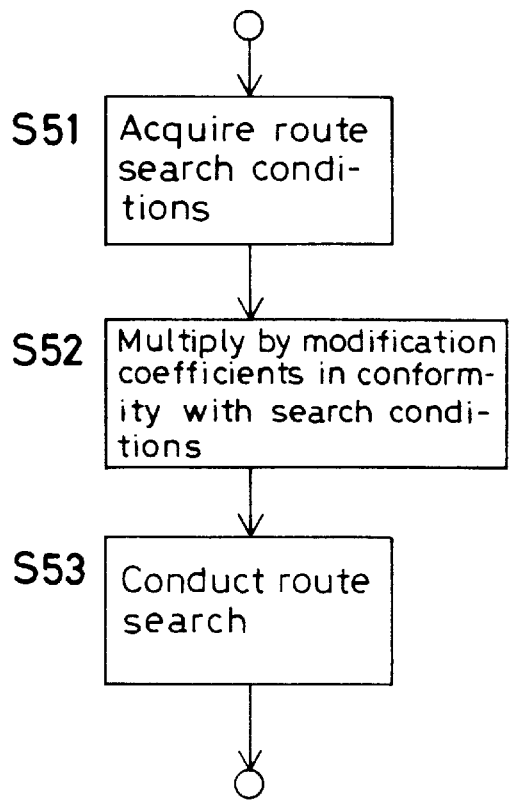
FIG. 15 is a flowchart showing the flow of search processing in a case where search conditions are capable of being modified in a search for an alternative route.
FIG. 16 is a diagram showing modification coefficients as search conditions in a search for an alternative route.

In a case where the search for an alternative route has been designated during the guidance for an initial route, namely a route retrieved initially by the setting of locations such as a destination, first the route search conditions are acquired (step S51), as shown in FIG. 15. Search conditions in a route search include shortest time, a condition set with ease of travel serving as the reference, or merely the cost of road data or intersection data stored in the system in advance, without these conditions being specifically designated. The user is capable of making selections and designations by entering these using the display screen. Of course, an operation for raising the cost of the road data and branch-point data of the currently suggested route is performed at the time of the alternative-route search and the route currently being suggested is not taken to the greatest extent possible. Next, the cost of road or branch-point data is multiplied by a modifying coefficient based upon the search conditions selected and acquired (step S52). As shown in FIG. 16, the modifying coefficients are stored in correspondence with search conditions such as shortest time and ease of travel with regard to conditions such as road classification, road width, left and right turns, traffic signals, length and vehicle velocity corresponding to the cost of road data and branch-point data. At the time of the search, cost is modified by multiplying the cost of a road or branch point by these coefficients. For example, in a case where shortest time has been set as a search condition, routes having left and right turns or routes having many traffic signals are made less likely to appear by doubling the coefficient for left and right turns or the coefficient for traffic signals. If ease of travel has been selected as the condition, routes along complicated roads or roads of narrow width are made less likely to appear by doubling the coefficient for route classification or road width. If no particular condition has been designated, all of the coefficients are made 1 and no change is made in the cost of the route currently being suggested and in the cost of the other roads and branch points stored in the data. A route search is executed based upon the coefficients thus decided (step S53). In this embodiment, the arrangement is such that the user is capable of selecting and designating search conditions. However, it may be so arranged that preferred search conditions are stored on the above-mentioned IC card. Performing processing in this manner makes it possible to find a route conforming to the preference of the user.

The embodiment described above is such that when search conditions have been designated at the time of a search for an alternative route, the cost of the route currently being suggested is set high and then the cost is multiplied by a modifying coefficient in conformity with the search conditions. However, an arrangement may be adopted in which the cost of the route currently being suggested is raised after the cost is multiplied by the modifying coefficient. Further, an arrangement may be adopted in which an alternative route is searched for merely by an operation of multiplying cost by a modifying coefficient in response to designation of search conditions without performing the operation of raising the cost of the route currently being suggested. If this arrangement is adopted, it is not especially necessary to avoid the vicinity ahead of the present position of the vehicle but it is possible to meet the demand that the user be able to change the course in accordance with his or her preference and try traveling on the course changed.

In the foregoing embodiment, it is possible to designate search conditions at the time of a search for an alternative route but it is also possible to designate search conditions at the time of an initial search. In such case an arrangement may be adopted in which the modifying coefficients of each search condition are changed between values at the time of the initial search and values at the time of the search for the alternative route.

In the above-mentioned embodiment, an initial search is performed upon initially entering a point such as a destination, and a search for an alternative route is conducted when so desired by the user during travel on the initial route. However, means may be provided for executing a further alternative-route search by pressing the "ALTERNATIVE ROUTE" key during travel on a route already found by an alternate-route search, thus making it possible to output alternative routes repeatedly. Adopting this arrangement makes it possible to select an alternative route in line with user preference.

The construction of another embodiment of a vehicular navigation system according to the present invention shown in FIG. 18 will now be described. The system shown in FIG. 18 comprises an information storage unit 110 storing search data necessary for calculating routes, navigational data such as route data and guidance data necessary for instructional guidance; a central processor 120 for performing control of the overall system; an audio controller 130 which, in response to a guidance command from the central processor 120, converts audio data to an analog signal to drive a speaker 134 and output guidance audio; a display unit 128 for displaying route guidance on a screen in response to a driver request or automatically; an input unit 119 for entering a destination or en-route location and requesting route guidance; a present-position sensing unit 140 for calculating present position of the vehicle; and a route memory 124 for storing route data, which has been calculated by the central processor 120, up to the destination.

The information storage unit 110 is a data base in which all data is stored, namely map data necessary for route guidance, coordinate data, node data, road data, photographic data, destination data, guidance-location data, detailed destination data, road name data, branch-point data, address data and display guidance data. Guidance information such as map data in line with a route for performing route guidance is stored in a guidance-information storage unit 110a. Audio guidance data for operation at the time of route setting and indicative of destination name on a route as well as audio data necessary for guidance audio during route guidance is stored in an audio storage unit 110b upon being compressed. The information storage unit 110 functions as the memory means described in the claims.

The present-position sensing unit 140 uses a present-position measurement unit 112 to verify the present position of the vehicle based upon vehicle position information received by a GPS receiver 114 which utilizes a global positioning system (GPS), heading information sensed by a heading sensor 116, distance information sensed by a distance sensor 118, steering angle information sensed by a steering sensor 117 and map information read out of the information storage unit 110. This present position information is sent to the central processor 120. The steering sensor 117 senses the steering angle of the steering wheel and utilizes it in map matching or the like for correcting the present position to an intersection position on a map when a left or right turn is made at the intersection. The present-position sensing unit 140 functions as present-position sensing means set forth in the claims.

The input unit 119 enters route setting conditions for setting destinations and en-route locations, designates re-search and instructs the central processor 120 to execute processing necessary for navigation in accordance with the driver's volition in such a manner that guidance information is obtained by voice and/or screen display when required by the driver.

The central processor 120 comprises a route calculator 122 for calculating a route to the destination based upon map information read out of the information storage unit 110 and present position information from the present-position sensing unit 140 and storing this route data in the route storage unit 124, and a route-guidance controller 126 which, either automatically or in response to a request signal, executes voice guidance and/or displayed guidance based upon guidance information stored in the information storage unit 110, present-position information sensed by the present-position sensing unit 140 and route information calculated by the route calculator 122.

The route-guidance controller 126 has a traversal processor 126a which, in instruction guidance for a route in which an en-route location (also referred to as a "transit point" below) has been set, effects a changeover to instruction guidance for a route to a destination when the en-route location is passed, and a traversal determination unit 126b for determining whether this en-route location has been passed. The traversal determination unit 126a functions as guidance control means set forth in the claims, and the traversal determination unit 126b functions as traversal determination means set forth in the claims.

The display unit 128 is constituted by a color CRT or color liquid-crystal display device and is provided in the instrument panel in the vicinity of the driver's seat. The driver can verify the present position of the vehicle by observing interval maps and intersections and obtain information regarding a route based thereon. In addition, the driver confirms intersections at which traveling direction is to be changed as well as forward direction as based upon a left or right turn at these intersections. All screens necessary for navigation such as a route setting screen based upon map data or guidance data processed by the route-guidance controller 126, a route-search map screen, a route re-search map screen, an all-routes map screen, an interval map screen, an intersection map screen and an arrival-guidance map screen are outputted to the display unit 128 in color.

The above-mentioned screens are provided with function buttons for setting route guidance and performing a guidance or screen changeover operation during route guidance. More specifically, the display unit 128 is provided with a touch panel that corresponds to the display of buttons. The operations described above are executed based upon signals entered by touching the buttons. Input signal generating means constituted by these buttons and touch panels constructs the input unit and a detailed description thereof is omitted.

In response to a voice guidance command from the route guidance controller 126, the audio controller 130 combines audio, phrases, single sentences and sounds read out of an audio storage unit 132 and outputs the result from the speaker 134. When a command for displaying the all-routes map is issued by the route guidance controller 126, the audio controller 130 outputs a destination name, which is displayed on the all-routes display screen, in the form of a guidance voice track from the speaker 134. For example, the voice track "THIS ROUTE PASSES THROUGH THE HIGH-SPEED NAGOYA INTERCHANGE" is outputted.

In a case where route guidance to a destination is provided, the destination is designated on the screen of the display unit 128 by the input unit 119 or is entered by place name. If route guidance is given to this destination, a route from the present position, which has been sensed by the present-position sensor 140, to the destination is calculated by the route calculator 122 of the central processor 120 and the calculated route is stored in the route storage unit 124. A suitable route search method is employed in route calculation. After the destination is entered and the route decided in this manner, actual route guidance is carried out. Map information in the vicinity of the vehicle is read out of the guidance-information storage unit 110a of the information storage unit 110 by the route-guidance controller 126 of the central processor 120 and is displayed on the display unit 128 in a form superimposed on the present vehicle position, the direction of travel and the route that has been stored in the route storage unit 124.

When an en-route location is entered from the input unit 119 together with a destination, the route calculator 122 calculates a route to the destination via the set en-route location and stores the route in the route storage unit 124. A suitable search method for a route passing through an en-route location is to perform a route search from the present position to the en-route location using the en-route location as a provisional destination, perform a route search to the original destination using the en-route location as the starting point and connect the result with the results of the route search for the route to the en-route location. The route calculator 122 and route storage unit 124 function as the route searching means set forth in the claims.

The display unit 128 is provided in the instrument panel in the vicinity of the driver's seat. By observing the display, the driver confirms the position of the vehicle and obtains information regarding route ahead. As an example of a display, a selected route can be displayed as a bold line, other roads can be displayed as fine lines, the position of the vehicle can be indicated by a circle mark, and the forward direction of the vehicle can be indicated by a wedge-shaped arrow.

When the vehicle position approaches an intersection at which a change in course is to be made, the name of the intersection and the distance to this intersection are displayed on the display unit 128. Further, the route guidance controller 126 instructs the audio controller 130 to generate audio, which corresponds to route guidance up to the intersection, along with the display. The audio controller 128 reads out information stored in the audio storage unit 132 as digital data and converts this data to an analog signal to drive the speaker 134. The speaker performs route guidance by indicating the route to the driver in the manner "TURN LEFT AT xxx INTERSECTION LOCATED ABOUT 300 METERS AHEAD". Such an audio indication is performed at prescribed distances until the intersection is passed. For example, in a case where the vehicle is traveling on a road having two or more lanes, guidance is provided a first time 700 meters from the intersection, a second time 300 meters from the intersection and a final time 100 meters from the intersection. Such guidance audio is stored in the audio storage unit 132 as digital phrase by phrase. When the guidance audio is outputted, plural items of the data are read out and combined and delivered from the speaker 134 as a guidance signal. The output timing of the guidance audio is detected by the route guidance controller 126 and processing for outputting the audio is executed by the audio controller 130.

Thus, the vehicle is guided along the retrieved route by a screen display or audio instructions. In accordance with the present invention, however, route guidance to the destination is made possible, with or without designation of an en-route location, if the vicinity of the en-route location is passed. Furthermore, in the present invention, route guidance to the destination is made possible in a case where the present position of the vehicle is detected on the suggested route beyond an en-route location even if the vehicle does not pass through the vicinity of the en-route location. Moreover, route guidance from the present position to an en-route location and route guidance from the en-route location to the destination are performed independently of each other. To this end, en-route location traversal processing is executed and a changeover is made to route guidance from the en-route location to the destination upon determining whether the vehicle is on the route, whether it is beyond the en-route location or whether there is an en-route location within a prescribed distance from the present position.

Figures 19, 20:
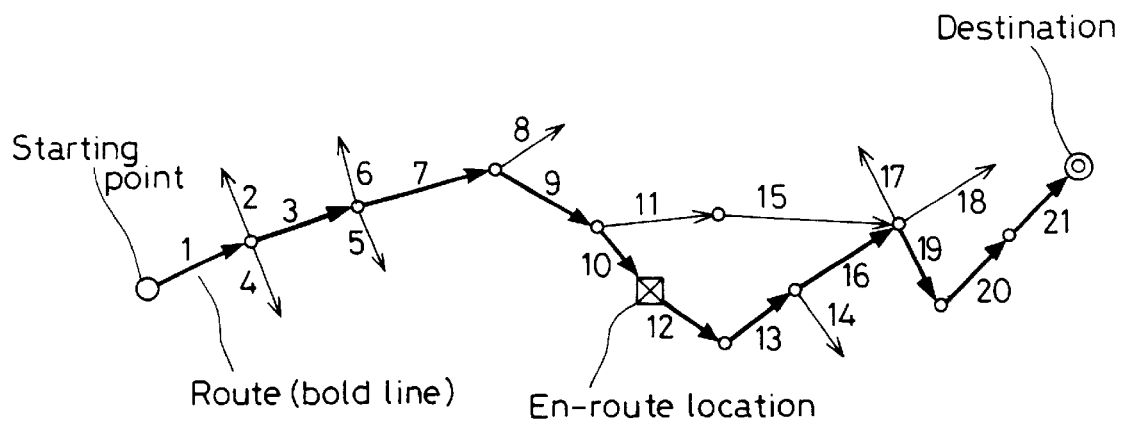
FIG. 19 is a diagram for describing a suggested route from a starting point to a destination.
FIG. 20 is a diagram for describing data representing a string of suggested roads.

Next, the data structure of route guidance will be described. FIG. 19 illustrates a suggested road from a starting point to a destination. This is one example in which an en-route location (transit point) has been set along the way. The number of the road initially traveled on from the starting point is made "1", and numbers are assigned to all roads connecting to this road at branch points, merge points and intersections. In the illustrated example, "2", "3" and "4" are assigned to roads that connect to the road of number "1", and roads of numbers "5"~"7" connected to a branch point which includes the road of number "3". Roads of numbers "8" and "9" connect to the road of number "7", and roads of numbers "10" and "11" connected to the road of number "9". Thus, a string of roads of numbers 1→3→7→9→10 are connected as the route from the starting point to the en-route location (transit point). Similarly, a string of roads of numbers 12→13→16→19→20→21 are connected as the route from the en-route location (transit point) to the destination. For example, in a case where the road indicated by the bold line in FIG. 19 is adopted as the suggested route, the route is composed of 11 guidance roads. The data representing this string of suggested roads is illustrated in FIG. 20.

Next, en-route location processing in the vehicular navigation system according to the present invention will be described.

Figure 21:
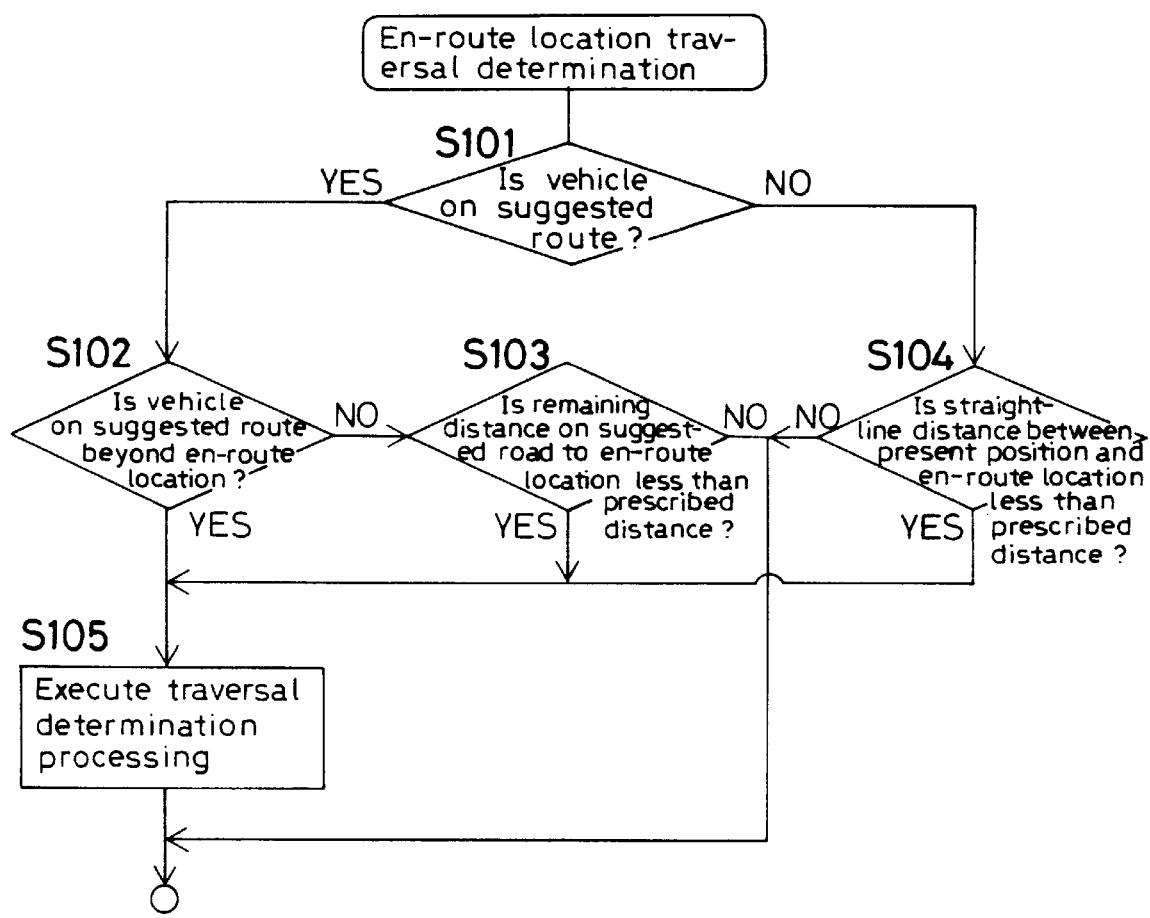
FIG. 21 is a diagram for describing the flow of processing for judging traversal of an en-route location.
Figure 22A:
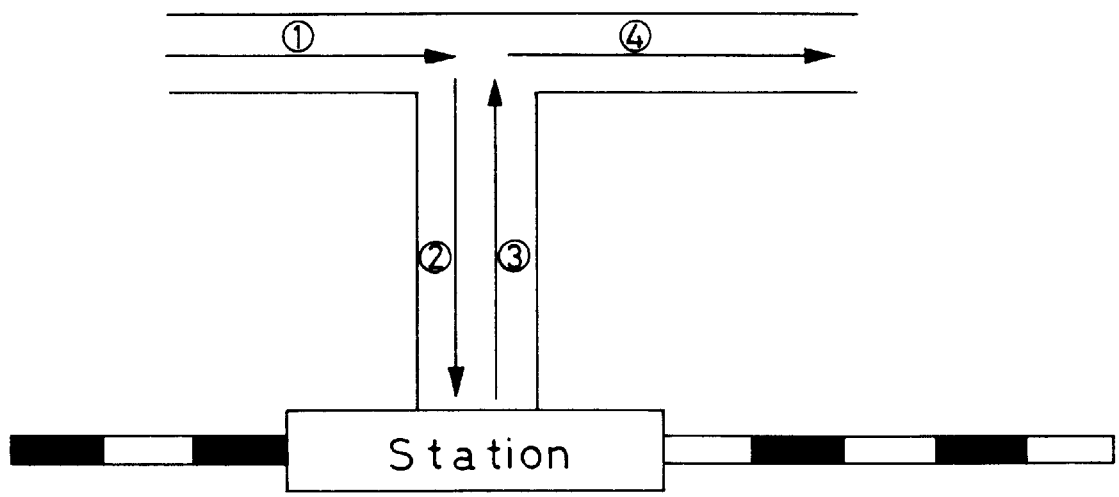
FIGS. 22A and 22B are diagrams for describing an example of the suggested route for an en-route location and of discrimination of the en-route location.

When a destination and an en-route location (transit point) are entered and set in the navigation system, a route is calculated by the route calculator 122 and the route is stored in the route storage unit 124. When route guidance is started, route guidance from the starting point to the en-route location (transit point) is performed by a screen display or audio indication based upon the search results, from the starting point to the en-route location (transit point), calculated by the route calculator 122 and stored in route storage unit 124. Next, it is determined whether the present position of the vehicle is on the suggested route (step S101), as shown in FIG. 21. This determination is made by comparing the present vehicle position sensed by the present position sensor 140 and the suggested route stored in the route storage unit 124. In a case where the vehicle is traveling on the route, it is further determined by first determination means whether the vehicle is beyond the en-route location (step S102). In a case where the vehicle is on the suggested route but is not on the suggested route beyond the en-route location, it is determined by second determination means whether the remaining distance on the route up to the en-route location lies within a prescribed distance (step S103). If the remaining distance lies within the prescribed distance, the fact that the en-route location (transit point) has been passed is discriminated by en-route location traversal determination means and en-route location traversal processing is executed (step S105). Similarly, if the vehicle is judged to be on the suggested route beyond the en-route location (transit point) at step S102, then the fact that the en-route location (transit point) has been passed is discriminated by the en-route location traversal determination means and en-route location traversal processing is executed. In this example, if "STATION" has been set as the en-route location because the driver wishes to pass through "ROAD IN FRONT OF STATION" on the route shown in FIG. 22A, the suggested route ①→②→③→④ illustrated in FIG. 22A is set. However, in a case where the driver does not intend to enter the station, the route ①→④ is traveled. In such case, en-route location traversal processing is executed if the vehicle is on the suggested route and, moreover, is on the suggested route beyond the en-route location. In case where it is found at step S103 that the remaining distance on the route to the en-route location lies within the prescribed distance, guidance to the en-route location is continued.

Figure 22B:
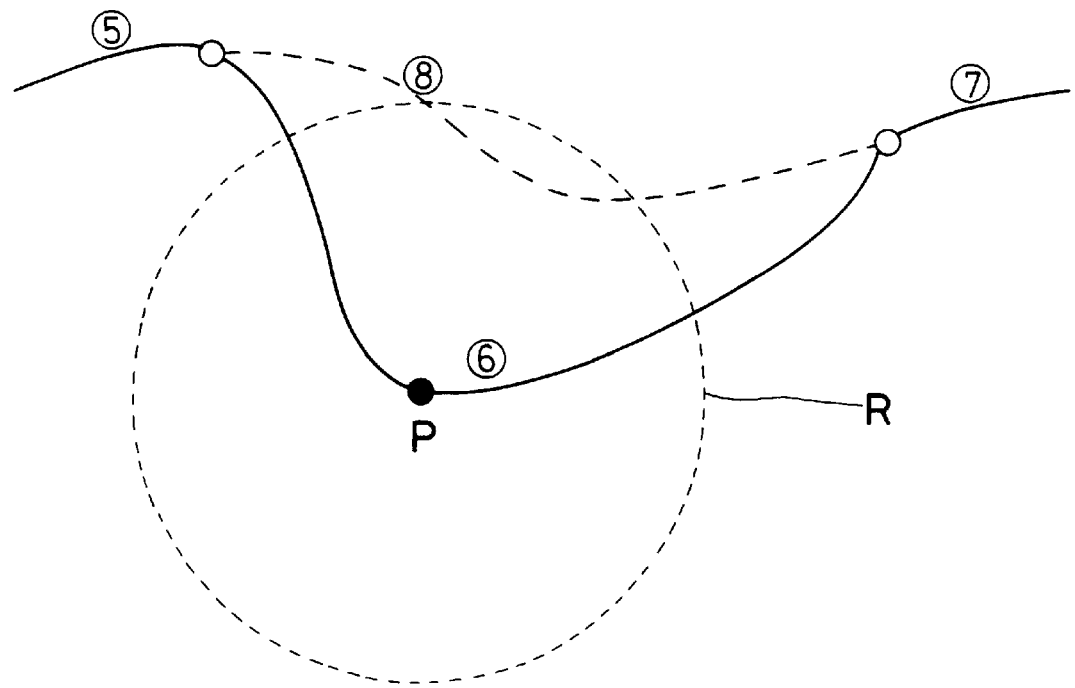

If the vehicle is not on the suggested route, i.e., if the vehicle is traveling off the suggested route, at the on-route determination process step (step S101), it is determined whether the straight-line distance between the present vehicle position and the en-route location is less than a prescribed distance (step S104). If the straight-line distance is less than the prescribed distance, it is judged that the en-route location (transit point) has been traversed and then en-route location traversal processing is executed (step S105). If the straight-line distance is not less than the prescribed distance, then the system waits for the next input without providing guidance. This example is for a case where, rather than taking the suggested route ⑤→⑥→⑦ passing through an en-route location P shown in FIG. 22B, a bypass is taken in the manner ⑤→⑧→⑦ without traversing the route to the en-route location P. When, during travel on the route ⑧, the vehicle enters a location in the range of a circle R of a prescribed distance centered on the en-route location P, a YES decision is rendered at the decision of step S104 and en-route location traversal processing is executed. If the vehicle does not enter the range of the circle R of the prescribed distance centered on the en-route location P regardless of the location on the route, en-route location traversal processing is not executed, YES decisions are rendered at steps S101 and S102 when the vehicle merges with route ⑦, and en-route location traversal processing is executed. Step S102 functions as first determination means set forth in the claims, and steps S103, S104 function as the second determination means set forth in the claims.

After en-route location traversal processing (step S105) is executed, guidance is provided by a screen display or audio indication based upon search results from the en-route location to the destination calculated by the route calculator 122 and stored in the route storage unit 124.

Figure 18:
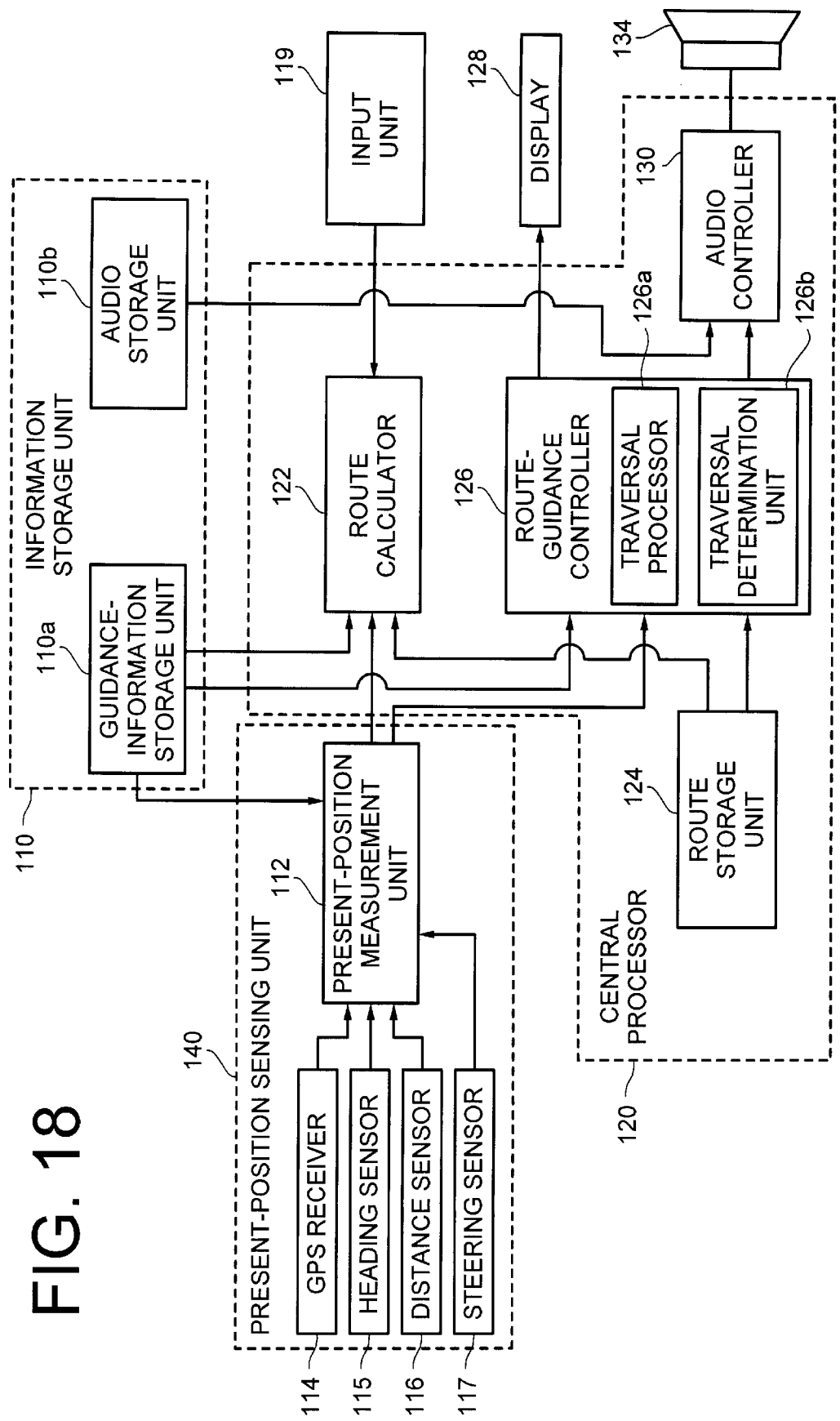
FIG. 18 is a diagram showing the construction of another embodiment of a vehicular navigation apparatus according to the present invention.

The en-route location determination processing is executed by the traversal determination unit 126b shown in FIG. 18. En-route location traversal processing is performed by the traversal processor 126a in response to entry of a traversal signal from the traversal determination unit 126b.

Figure 23:
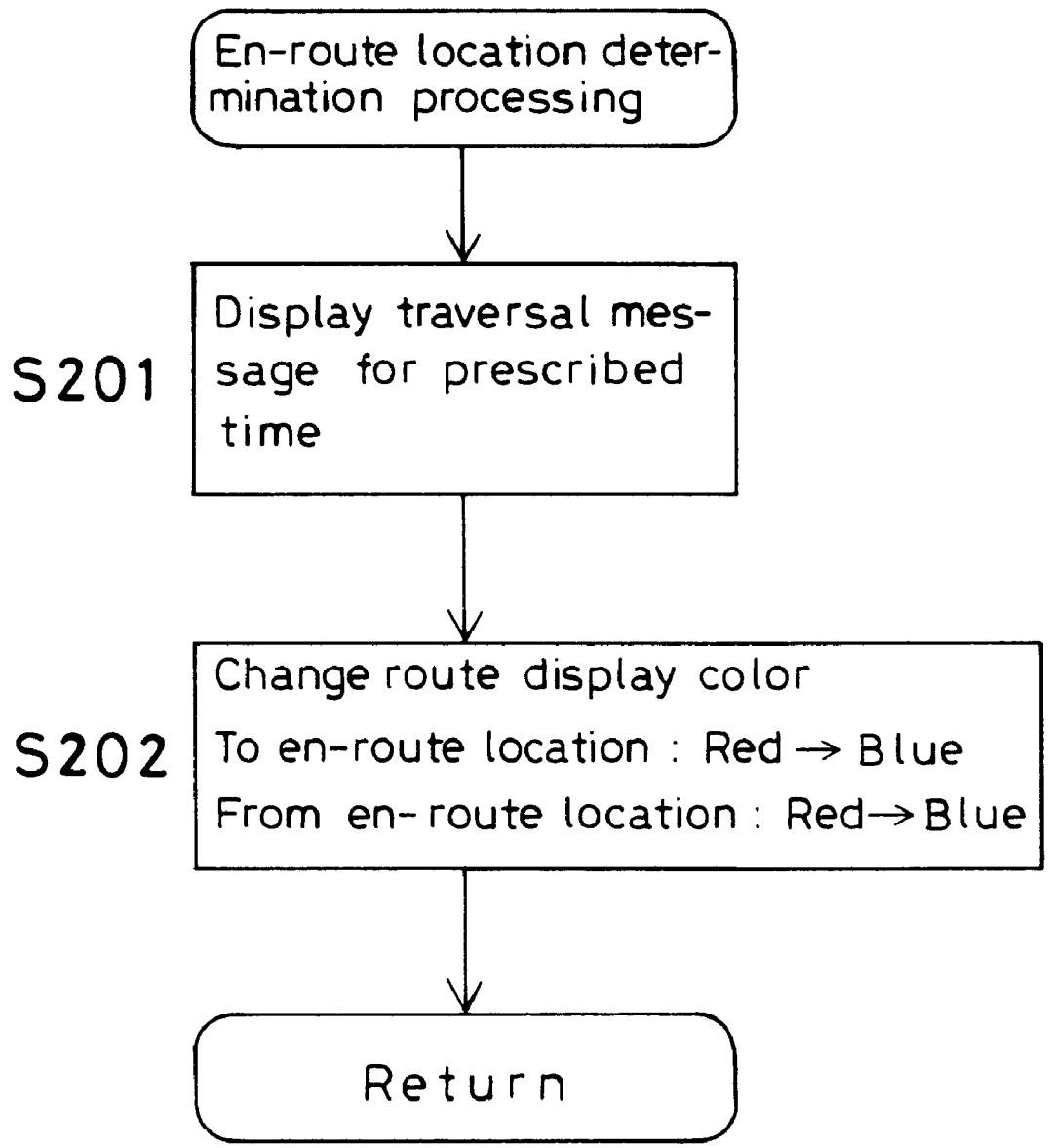
FIG. 23 is a diagram for describing en-route location traversal processing.

The en-route location traversal processing shown in FIG. 23 will be described next. When it has been determined by the traversal determination unit 126b that the en-route location (transit point) has been traversed, the traversal processor 126a causes the display unit 128 to display, for a prescribed time such as 30 seconds, a message informing of the fact that the en-route location (transit point) has been passed (step S201), as shown in FIG. 23. The display color of the suggested route presented on the display unit 128 is changed (step S202). More specifically, before the en-route location is passed, the suggested route up to the en-route location is displayed in the color red and the suggested route from the en-route location to the destination is displayed in the color blue. After the en-route location is passed, the route up to the en-route location and the route from the en-route location to the destination are both displayed in the color blue.

Further, the vehicular navigation system according to the present invention senses whether the vehicle is on the suggested route by comparing the present vehicle position sensed by the present-position sensor 140 and the suggested route stored in the route storage unit 124 and, if the vehicle is off the suggested route, displays a re-search switch on the display unit 128. The system has a function in which, in response to operation of the re-search switch, a route for returning from the position at which the switch was operated to the suggested route is searched for anew. This function is implemented in the route calculator 122 and is performed by storing the new suggested route in the route storage unit 124.

Figure 24:
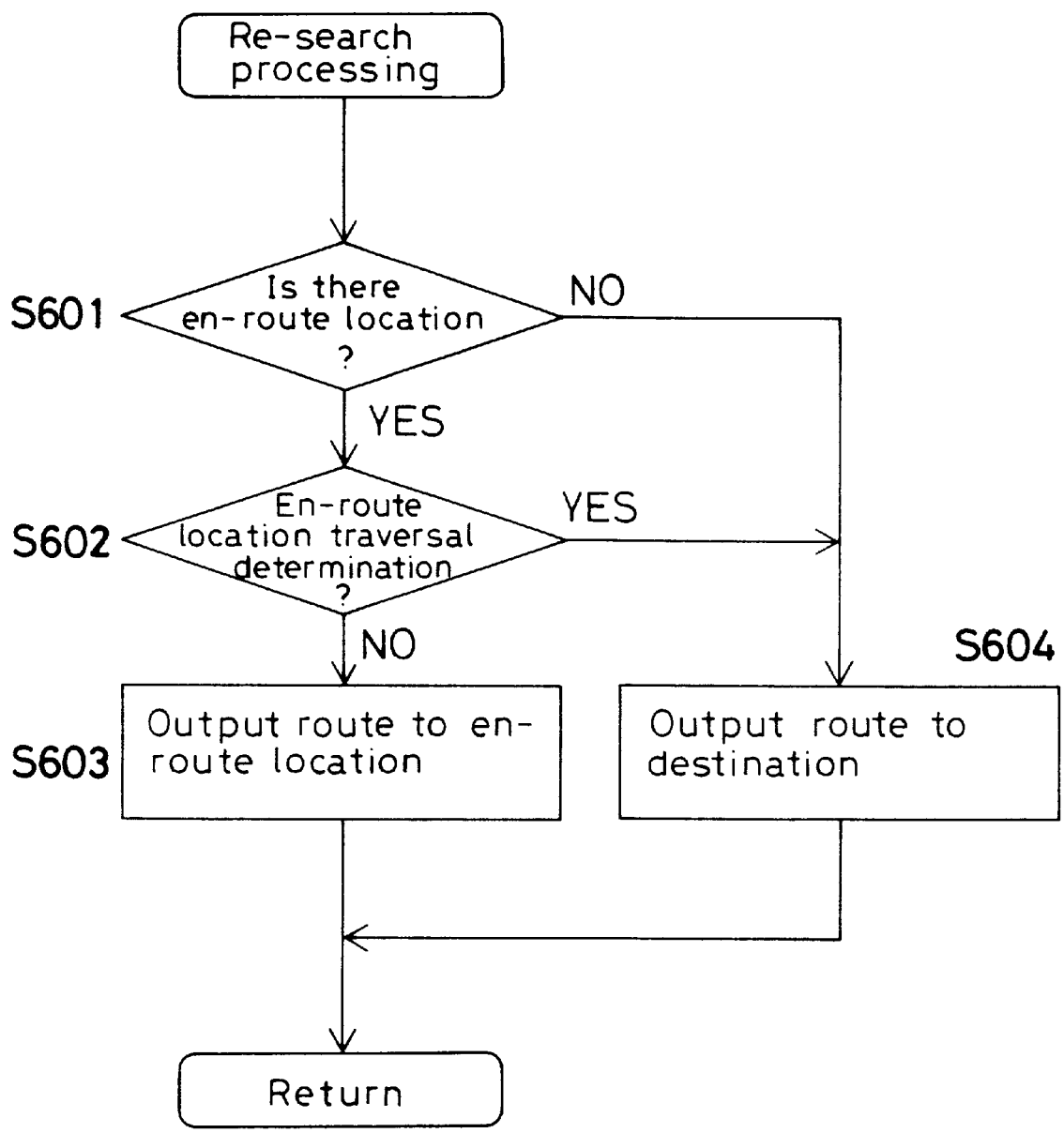
FIG. 24 is a diagram for describing the flow of processing for performing a re-search according to the prior art.

Next, re-search processing in a case where an en-route location has been set will be described. In conventional re-search processing for a case where an en-route location has been set, it is determined whether the en-route location has been set (step S601), as shown in FIG. 24. If the en-route location has been set, it is determined whether this location has been passed (step S602). If the en-route location has not been passed, the route from the present position to the en-route location is searched for again and the route to the en-route location is outputted (step S603). On the other hand, if it is determined that the en-route location has not been set or that the en-route location has already been passed, the route from the present position to the destination is searched for again and the route to the destination is outputted (step S604). When the vehicle departs from suggested route in this conventional case where the en-route location (transit point) has been set, a route traversing the en-route location (transit point) is always searched for again until a determination is made to the effect that the en-route location (transit point) has been passed. However, there are also cases in which the setting of an en-route location is performed in dummy fashion, as mentioned earlier, and therefore the conventional system does not necessarily meet the demand for the acquisition of a route that does not pass through en-route location.

Figure 25:
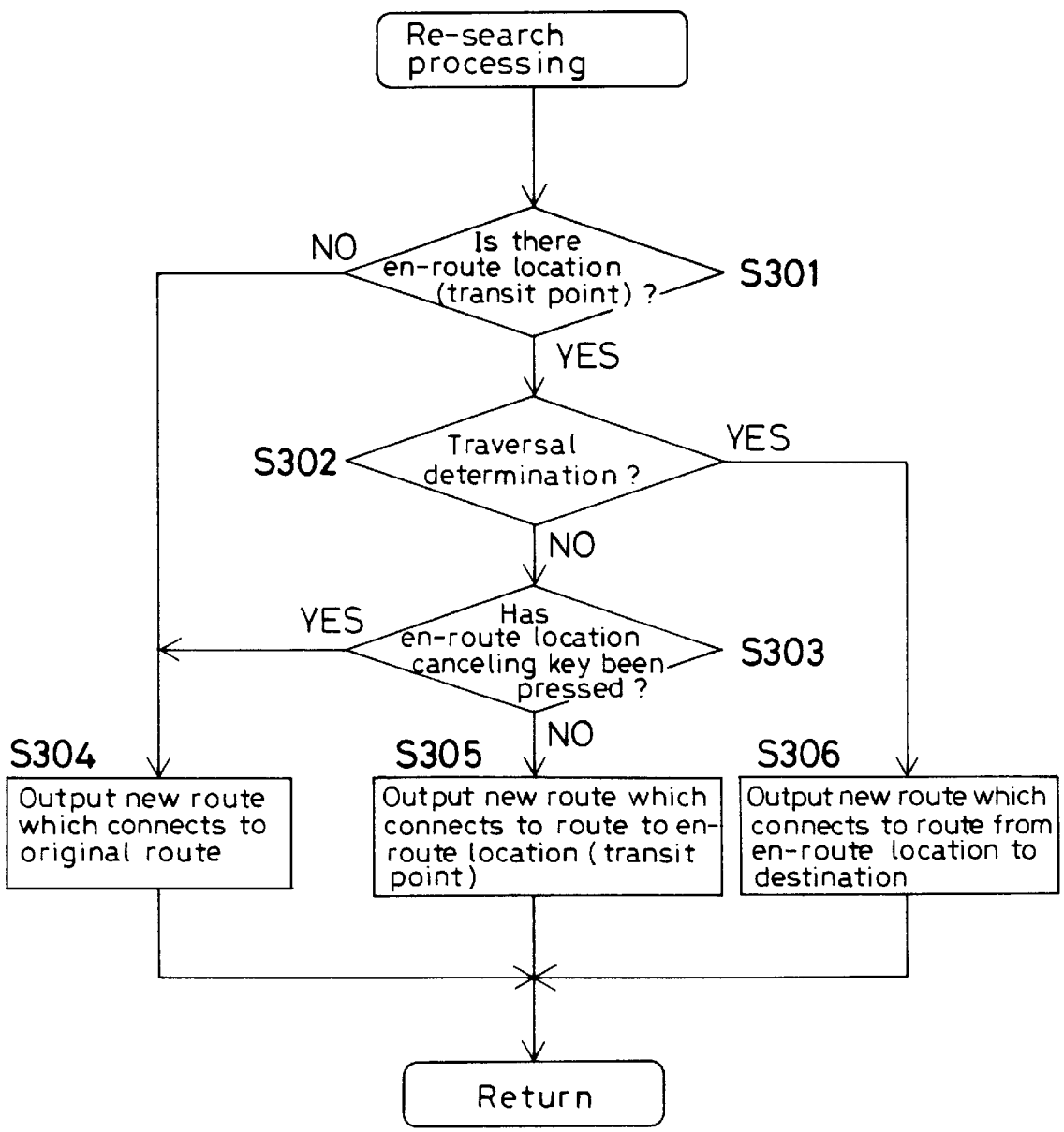
FIG. 25 is a diagram for describing the flow of processing for performing a re-search.

By contrast, in accordance with the present invention, it is determined whether an en-route location (transit point) has been set (step S301), as shown in FIG. 25. If the en-route location (transit point) has been set, it is determined whether the en-route location has been passed (step S302). If it is determined that the en-route location has not been passed, then it is determined whether cancellation of the setting of the en-route location has been instructed (step S303). If cancellation of the setting of the en-route location has been instructed, then a new route that connects to the original route is outputted (step S304). If the setting of the en-route location is left as is and not canceled, then a new route that connects the route to the en-route location is outputted (step S305). Furthermore, if it is determined that the en-route location has been passed at the en-route location traversal decision of step S302, a new route that connects to the route from the en-route location to the destination is outputted (step S306). If it is found at step S301 that an en-route location has not been set, a new route that connects to the original route up to the destination is outputted in the same manner as when the setting of the en-route location is canceled (step S304).

Figure 26:
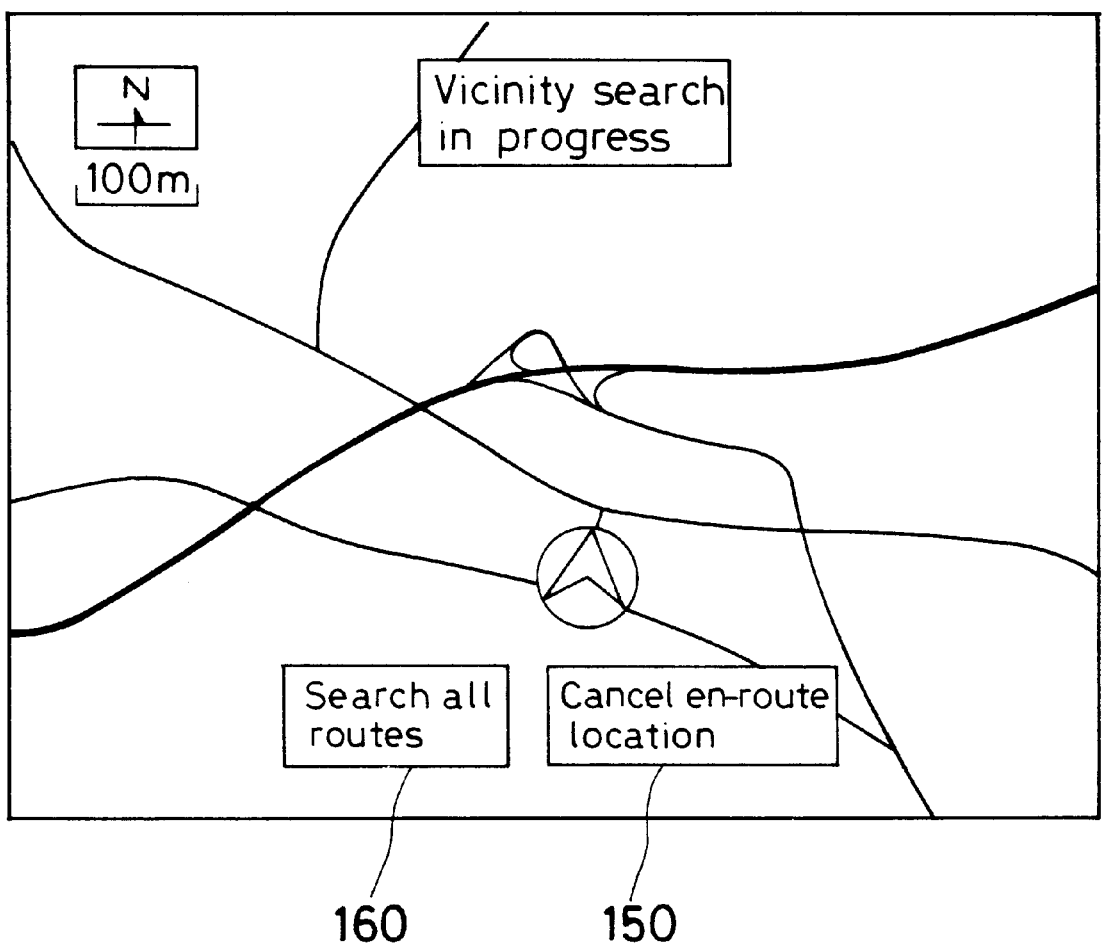
FIG. 26 is a diagram for describing an example of an operation for erasing an en-route location during the course of a re-search.

A switch for canceling the en-route location at step S303 will now be described. When it is sensed that the vehicle has departed from the suggested route, the re-search switch is displayed. If the operator desires a re-search and the re-search switch is pressed, the en-route location canceling switch is displayed on the display unit 128, as shown in FIG. 26, only when the en-route location (transit point) has been designated at the time of the initial route search from the starting point to the destination. By operating the en-route location canceling switch during the execution of a re-search, the setting of the en-route location (transit point) is canceled and it is possible to set a re-search up to the en-route location or a re-search off the en-route location depending on how the operation is made. In other words, it is possible to execute a re-search processing based upon the volition of the driver. For example, when, at the time of the initial route search, the driver considers traveling to the destination by a route traversing an en-route location but it subsequently becomes unnecessary to traverse the en-route location in a situation where the vehicle has left the initial suggested route because of heavy traffic or for some other reason, as when there is no longer any time left to traverse the en-route location, the driver cancels the setting of the en-route location. As a result, it is possible to prevent inadvertent guidance to an en-route location at the time of a re-search. In a case where the driver desires to traverse the en-route location at all cost, it is possible to provide route guidance for a route traversing the en-route location, even if the vehicle is off the original suggested route, so long as cancellation of the en-route location is not performed.

A case in which the vehicle has departed from the suggested route will be described. FIG. 26 illustrates a screen displayed after the vehicle departs from the suggested route and the re-search switch is pressed. This screen has an en-route location (transit point) switch 150 for canceling the en-route location (transit point) when a route connecting the present position of the vehicle to the original suggested route is searched for, and an all-routes search switch 160 for changing the range of the search. In a case where the en-route location (transit point) has not been set, as mentioned above, in a state in which the all-routes search switch is not operated, a so-called vicinity search is performed to search for a new route, which connects to the original suggested route, when the vehicle departs from the suggested route. However, when the all-routes search switch is operated in this state, a suggested route from the present position of the vehicle to the destination is searched for and not a route connecting to the original suggested route. Further, if, in a case where an en-route location (transit point) has been set, traversal has not been determined and the en-route location (transit point) canceling switch has not been pressed, a suggested route from the present vehicle position to the en-route location (transit point) is retrieved. In a case where traversal has been determined, a suggested route from the present vehicle position to the destination is retrieved in the same manner as when the en-route location (transit point) is not set.

Thus, the vehicular navigation system of this embodiment is such that when traversal of an en-route location (transit point) has been determined, a determination is made that is more in line with the driver's preference than in the conventional case where traversal is determined by sensing that the present position of the vehicle has fallen within a prescribed distance range of the en-route location.

More specifically, in a case where a station is set as the en-route location, as shown in FIG. 22A, because the driver wishes to travel the road in front of the station, the conventional system is such that when the vehicle travels the route ①→④, it is judged that the en-route location has not been passed. Consequently, there are instances where guidance for route instruction beyond ④, namely guidance for the route from the en-route location to the destination, cannot be received. By contrast, according to this embodiment, the route ④ is the route from the en-route location to the destination in a case where the route ①→④ is traveled, and therefore it is judged that the en-route location has been passed. As a result, guidance for the route from the en-route location to the destination can be received and route guidance in line with the driver's preference can be provided.

Further, by way of example, if, in a case where a suggested route is detoured because of construction or heavy traffic, the en-route location resides in the section that is under construction or congested with traffic, a determination that the en-route location has been passed is not made and there are instances in which guidance for a route beyond the en-route location cannot be received, similar to the situation described above. In this case, moreover, the route up to the en-route location is searched for again, even if the suggested route is detoured and searched for again, and therefore guidance to the destination cannot be received. In such case it is necessary for the driver to temporarily stop the vehicle, set the destination again and initiate the search for the suggested route to the destination. By contrast, this embodiment is so adapted that in a case where a suggested route has been detoured because of construction or heavy traffic, route guidance to the destination is started, even if a determination that the en-route location has been passed is not made, so long as the vehicle is on the suggested route of the detour.

Further, even in a case where the suggested route is bypassed and a re-search conducted, a designation is made to perform either a re-search which takes the en-route location into account or a re-search which does not take the en-route location into account. This makes it possible to carry out road guidance that conforms to driver preference.

As many apparently widely different embodiments of the present invention can be made without departing from the spirit and scope thereof, it is to be understood that the invention is not limited to the specific embodiments thereof except as defined in the appended claims.

What is claimed is:

1. A navigation system for automatically providing an automotive vehicle with route guidance in accordance with a route set in advance, the system comprising:

a position sensing unit for sensing the present position of the vehicle;

an information storage unit containing map information and route information;

an input unit for entering a destination and a transit point and for inputting a command to perform a route search;

a notification means for outputting route guidance information; and a central processing unit having:

a route searching means for performing a route search from the sensed present position to at least one of the destination and the transit point by setting a first searching range in response to the input of the route search command;

a route memory means for temporarily storing a route found by said route searching means; and a route-guidance control means for outputting, to said notification means, a signal for performing route guidance on the basis of the stored route wherein said route searching means assumes that the stored route is a first route and searches for a second route, different from said first route, in response to the input of the route search command by setting a second searching range that is different from the first searching range.

2. The navigation system of claim 1, wherein said central processing unit comprises a route travel determination means for determining if the present position of the vehicle is on the stored route whereby, upon the input of the route search command, the route searching means sets the stored route as a first route when the automotive vehicle is found to be on the stored route and searches for a second route, different from said first route, by setting a searching range that is different from the searching range of said first route.

3. The navigation system of claim 1, wherein said route searching means sets a first cost to the stored route on which the vehicle is currently under guidance and searches for a second route from a plurality of available routes wherein the second route has a second cost that is lower than the first cost and is the lowest cost among the costs associated with each of the plurality of available routes.

4. The navigation system of claim 1, wherein said route searching means performs the additional steps of:

acquiring traffic information relating to each route;

setting a first cost to a route having at least one of traffic congestion and construction as determined by the acquired traffic information; and searching for a second route from a plurality of available routes wherein the second route has a second cost that is lower than the first cost and is the lowest cost among the costs associated with each of the plurality of available routes.

5. A navigation system for automatically providing an automotive vehicle with route guidance in accordance with a route set in advance, the system comprising:

a position sensing unit for sensing the present position of the vehicle;

an information storage unit containing map information, route information, cost of data representing roads and branch points and modification coefficients for modifying a cost corresponding to a plurality of search conditions;

an input unit for entering a destination, a transit point and a search criterion and for inputting a command to perform a route search from the present position to at least one of the destination and the transit point;

a notification means for outputting route guidance information; and a central processing unit having;

a route searching means for performing a route search from the sensed present position to at least one of the destination and the transit point in response to the input of the route search command;

a route memory means for temporarily storing a route found by said route searching means;

a route-guidance control means for outputting, to said notification means, a signal for performing route guidance on the basis of the stored route; and a route travel determination means for determining if the present position of the automotive vehicle is on the stored route wherein said route searching means selects the modification coefficients in response to the input of the route search command and it is determined that the automotive vehicle is on the stored route, modifies cost of data representing roads and branch points according to the modification coefficients, and searches for a route among a plurality of available routes in order to find the route having the lowest cost.

6. The navigation system of claim 5 wherein said route searching means sets a first cost to the stored route and on which the vehicle is currently under guidance, and searches for a second route having a second cost from a plurality of available routes in order to find the second route having a cost that is lower than the first cost and is the lowest among costs associated with the available routes.

7. A navigation system of claim 5 wherein said route searching means includes means for acquiring traffic information relating to each route, sets a first cost to a route having one of a traffic congestion and construction based on acquired traffic information, and searches for a second route having a second cost from a plurality of available routes in order to find the second route with the second cost that is lower than the first cost and is the lowest among costs associated with the available routes.

* * * * *